(12) United States Patent
Yamashita et al.

(10) Patent No.: US 9,170,862 B2
(45) Date of Patent: Oct. 27, 2015

(54) CONVERTING APPARATUS, CONVERSION METHOD, AND INFORMATION PROCESSING SYSTEM

(71) Applicant: FUJITSU LIMITED, Kawasaki, Kanagawa (JP)

(72) Inventors: Koichiro Yamashita, Hachioji (JP); Hiromasa Yamauchi, Usakos (NA); Takahisa Suzuki, Yokohama (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/669,638

(22) Filed: Mar. 26, 2015

(65) Prior Publication Data
US 2015/0227400 A1    Aug. 13, 2015

Related U.S. Application Data

(63) Continuation of application No. PCT/JP2012/074989, filed on Sep. 27, 2012.

(51) Int. Cl.
*G06F 13/00* (2006.01)
*G06F 9/54* (2006.01)
*G06F 12/02* (2006.01)
*G06F 9/44* (2006.01)

(52) U.S. Cl.
CPC .............. *G06F 9/542* (2013.01); *G06F 9/4405* (2013.01); *G06F 12/0292* (2013.01); *G06F 2212/65* (2013.01)

(58) Field of Classification Search
CPC ... G06F 9/3861; G06F 9/542; G06F 12/0292; G06F 13/24
USPC ............ 710/260; 711/202; 712/244; 719/318
See application file for complete search history.

(56) References Cited

U.S. PATENT DOCUMENTS

| 8,527,691 | B2 * | 9/2013 | Honda et al. .................. 711/103 |
| 2001/0020259 | A1 | 9/2001 | Sekiguchi et al. |
| 2007/0050593 | A1 * | 3/2007 | Chen et al. ..................... 711/202 |

(Continued)

FOREIGN PATENT DOCUMENTS

| JP | 60-91460 | 5/1985 |
| JP | 10-333790 | 12/1998 |

(Continued)

OTHER PUBLICATIONS

International Search Report mailed Nov. 13, 2012 in corresponding international application PCT/JP2012/074989.

(Continued)

*Primary Examiner* — Andy Ho
(74) *Attorney, Agent, or Firm* — Staas & Halsey LLP

(57) ABSTRACT

A converting apparatus includes a storage configured to store correspondence information that indicates correspondence relations between logical addresses accessed by a processor for booting and physical addresses converted from the logical addresses, the correspondence information being correlated with each type of an event booting the processor; and an address converter configured to select correspondence information related to the type of the event, specify a physical address converted from the logical address accessed by the processor in case of the processor accessing a logical address in response to the event, and control the processor to get a program stored in the storage, the program indicated by the specified physical address.

7 Claims, 27 Drawing Sheets

(56) References Cited

U.S. PATENT DOCUMENTS

2011/0113183 A1* 5/2011 Lee et al. .................. 711/103
2013/0191609 A1* 7/2013 Kunimatsu et al. ........... 711/203

FOREIGN PATENT DOCUMENTS

| | | |
|---|---|---|
| JP | 11-24943 | 1/1999 |
| JP | 11-338678 | 12/1999 |
| JP | 2010-218103 | 9/2010 |

OTHER PUBLICATIONS

International Preliminary Report on Patentability mailed Nov. 13, 2012 in corresponding international application PCT/JP2012/074989.

* cited by examiner

| EVENT | PHYSICAL ADDRESS | LOGICAL ADDRESS |
|---|---|---|
| Timer (Event E0) | 0x1000 | 0x0100 - 0x01ff |
| Event E1 | 0x1100 | 0x0100 - 0x01ff |
| Event E2 | 0x1200 | 0x0100 - 0x01ff |
| Event E3 | 0x1300 | 0x0100 - 0x01ff |
| ⋮ | ⋮ | ⋮ |

701 STORAGE
702 SELECTING UNIT — 703 SPECIFYING UNIT — 704 CONTROL UNIT

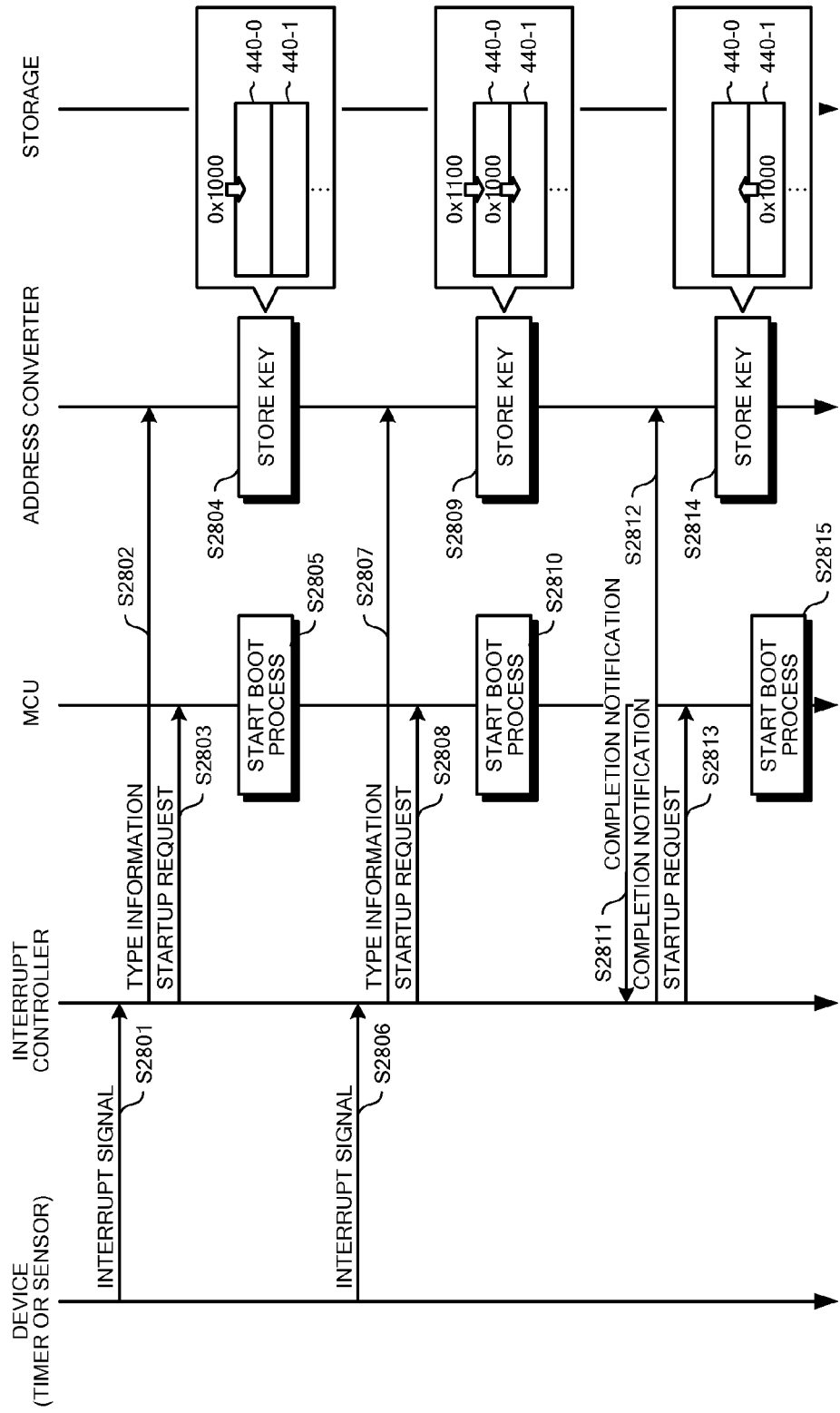

US 9,170,862 B2

CONVERTING APPARATUS, CONVERSION METHOD, AND INFORMATION PROCESSING SYSTEM

CROSS REFERENCE TO RELATED APPLICATIONS

This application is a continuation application of International Application PCT/JP2012/074989, filed on Sep. 27, 2012 and designating the U.S., the entire contents of which are incorporated herein by reference.

FIELD

The embodiment discussed herein is related to a converting apparatus, a conversion method, and an information processing system.

BACKGROUND

A sensor network (wireless sensor network (WSN)) is known which includes plural sensor-equipped wireless terminals (hereinafter, referred to as "sensor nodes") that are disposed in an installation area and cooperate to gather information that indicates the external environment or a physical state.

An existing technique related to reducing the power consumption in an information processing apparatus is for example a technique that, stops power supply to a processor and peripheral circuits, and when an interrupt controller detects occurrence of an event starts power supply to the processor and the peripheral circuits (see, e.g., Japanese Laid-Open Patent Publication No. H10-333790). A technique also exists that, when reloading a kernel of an operating system (OS) into a main storage, excludes storage contents related to a non-stop module in the main storage, from objects to be reloaded (see, e.g., Japanese Laid-Open Patent Publication No. H11-024943).

The conventional techniques above, however, have a problem in that, in activating the processor triggered by the occurrence of an event, the startup period until the activation of the processor is completed becomes longer consequent to branch processing for executing processes according to the type of event that has occurred.

SUMMARY

According to an aspect of an embodiment, a converting apparatus includes a storage configured to store correspondence information that indicates correspondence relations between logical addresses accessed by a processor for booting and physical addresses converted from the logical addresses, the correspondence information being correlated with each type of an event booting the processor; and an address converter configured to select correspondence information related to the type of the event, specify a physical address converted from the logical address accessed by the processor in case of the processor accessing a logical address in response to the event, and control the processor to get a program stored in the storage, the program indicated by the specified physical address.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 28 is a sequence diagram of an example of a procedure of a multiple interrupt process in the sensor node 100.

DESCRIPTION OF EMBODIMENTS

Embodiments of a converting apparatus, a conversion method, and an information processing system will be described in detail with reference to the accompanying drawings. The disclosed converting apparatus selects, when an event occurs, a combination of a conversion source logical address corresponding to the event and a physical address converted from the logical address and indicative of a storage area of a program corresponding to the event. When a processor accesses a conversion source logical address, the disclosed converting apparatus uses the selected combination to convert the logical address into a physical address, allowing the processor to get a program corresponding to the event.

A configuration may be such that the processor performs branch processing to execute among programs corresponding respectively to events, a program corresponding to an event that has occurred. The branch processing is a process of, e.g., specifying what event has occurred and selecting a program that corresponds to the specified event. This configuration, however, consumes time for the branch processing and lengthens the processor startup period. On the other hand, according to the disclosed converting apparatus, the processor can execute a program according to the event that has occurred without executing the above branch processing. As a result, the processor curtails the time consumed for the branch processing and has a shorter startup period. Embodiments will hereinafter be described by way of example of a sensor node that realizes an information processing system, including the converting apparatus of the present invention.

Figure 1:
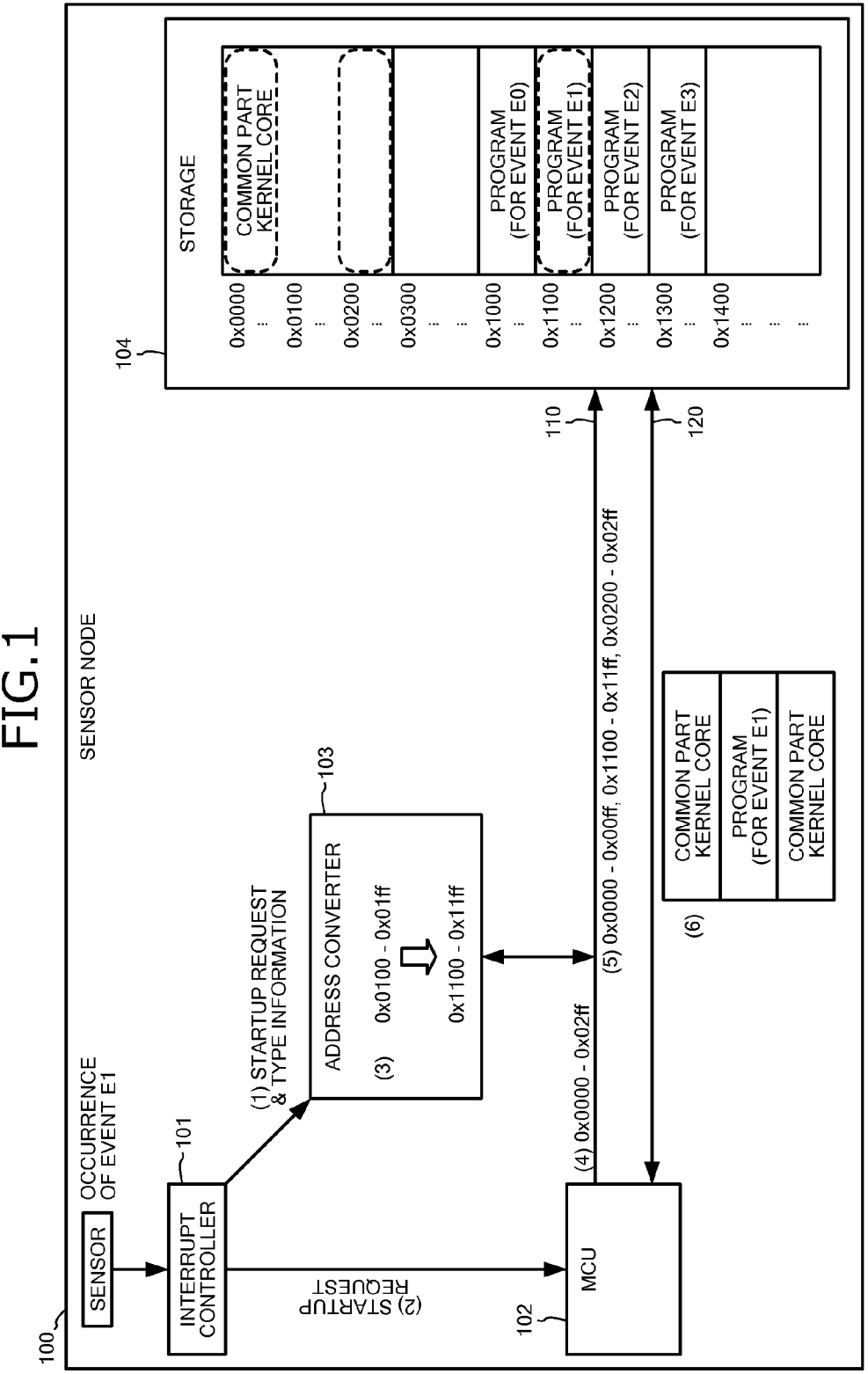
FIG. 1 is an explanatory view of an example of a flow of MCU activation in a sensor node.

FIG. 1 is an explanatory view of an example of a flow of MCU activation in a sensor node. As depicted in FIG. 1, a sensor node 100 includes an interrupt controller 101, a microprocessor (micro control processor (MCU)) 102, an address converter (converting apparatus) 103, and storage 104.

The interrupt controller 101 is an apparatus that detects the occurrence of an event as a trigger to boot the MCU 102. The event occurs for example as a result of timer measurement or sensor displacement detection. The event is a trigger that causes the processor to boot and execute a program corresponding to the event. The event caused, for example, by the timer or the sensor.

When detecting the occurrence of an event, the interrupt controller 101 sends a startup request and the type of the detected event to the address converter 103. The interrupt controller 101 sends a startup request to the MCU 102 when detecting the occurrence of an event.

The MCU 102 is an apparatus that boots when receiving a startup request. The MCU 102 outputs for example a logical address to an address bus 110 in sequence from an initial value "0x0000". As a result of the output of the logical addresses, the MCU 102 boots by getting and executing a program output from the storage 104 to a data bus 120.

The address converter 103 is an apparatus configured to convert a logical address into a physical address. The address converter 103 is configured to store correspondence information that indicates a correspondence relation between the conversion source logical address and the physical address converted from the logical address, correlated with each type of event. In this case, the address converter 103 stores the correspondence information as, for example, a conversion table described later with reference to FIG. 6.

The storage 104 is configured to store a program for booting the MCU 102. The program for booting the MCU 102 includes, for example, a common part kernel core to be executed commonly, irrespective of the event that has occurred. The program for booting the MCU 102 includes, for example, an event-specific program executed according to the event that has occurred. The storage 104 is implemented by for example read-only memory (ROM) or non-volatile memory.

In FIG. 1, (1) the interrupt controller 101 detects the occurrence of an event E1 as a trigger to boot the MCU 102. When detecting the occurrence of the event E1, the interrupt controller 101 sends a startup request to the address converter 103. The interrupt controller 101 then sends type information that indicates the type of the detected event E1 to the address converter 103. (2) When detecting occurrence of the event, the interrupt controller 101 sends a startup request to the MCU 102.

(3) The address converter 103 receives the startup request and becomes activated. When receiving the type information, the address converter 103 then selects correspondence information related to the type indicated by the received type information. The correspondence information related to the type indicates a correspondence relation between for example conversion source logical addresses "0x0100-0x01ff" and physical addresses "0x1100-0x11ff" converted from the logical addresses and indicative of a storage area where the type-specific program (program for the event E1 in the example of FIG. 1) is stored.

(4) The MCU 102 receives the startup request and starts to boot. For the boot, the MCU 102 outputs a logical address in sequence from the initial value "0x0000" of the logical address, for example, to the address bus 110. As a result of the output to the address bus 110, the MCU 102 then gets and executes a program output from the storage 104 to the data bus 110. As a result, the MCU 102 outputs the logical addresses sequentially from the initial value "0x0000" of the logical addresses up to a logical address "0x02ff" where the boot comes to an end.

(5) Each time the MCU 102 outputs a logical address to the address bus 110, the address converter 103 gets the output logical address. The address converter 103 converts the logical address into a physical address using the correspondence information selected at (3), and outputs the physical address to the address bus 110. Thereby, the address converter 103 causes a program stored in a storage area indicated by the physical address output to the address bus 110 to be output from the storage 104 to the data bus 120 and to be gotten by the MCU 102 at (4).

In a case where conversion source logical addresses "0x0100-0x01ff", for example, indicated by the correspondence information are output to the address bus 110, the address converter 103 refers to the correspondence information to convert them into physical addresses "0x1100-0x11ff".

On the other hand, in a case where other than the logical addresses indicated by the correspondence information, "0x0000-0x00ff, 0x0200-" are output to the address bus 110, the address converter 103 converts them into physical addresses "0x0000-0x00ff, 0x0200-" using an existing technique. Although in this case, the address converter 103 converts the logical addresses into the physical addresses using a page table, this is a conventional technique and therefore, will not be described in detail.

In other words, logical addresses "0x0000-0x02ff" output from the MCU 102 to the address bus 110 are converted by the address converter 103 into physical addresses "0x0000-0x00ff, 0x1100-0x11ff, 0x0200-0x02ff". The physical addresses "0x0000-0x00ff, 0x1100-0x11ff, 0x0200-0x02ff" are then output by the address converter 103 to the address bus 110.

(6) The storage 104 outputs to the data bus 120, the contents of a storage area indicated by the physical addresses output to the address bus 110. For example, the storage 104 outputs to the data bus 120, the common part kernel core stored in the storage area indicated by the physical addresses "0x0000-0x00ff".

The storage 104 outputs to the data bus 120, a program for the event E1 stored in a storage area indicated by the physical addresses "0x1100-0x11ff". The storage 104 outputs to the data bus 120, the common part kernel core stored in a storage area indicated by the physical addresses "0x0200-0x02ff".

This enables the MCU 102 to execute the output common part kernel core and program for the event E1 to boot. As a result, without determining what event has occurred, the MCU 102 sequentially accesses the logical addresses from the initial value "00000" so that a program corresponding to the event that has occurred can be executed for the boot. Thus, the MCU 102 can curtail the branch processing for selecting and executing a program corresponding to the event that has occurred, to shorten the startup period.

Since the branch processing can be curtailed in the MCU 102, the storage 104 need not store a program related to the branch processing. Therefore, usage of the storage 104 can be suppressed by curtailing the program related to the branch process.

Figure 2:
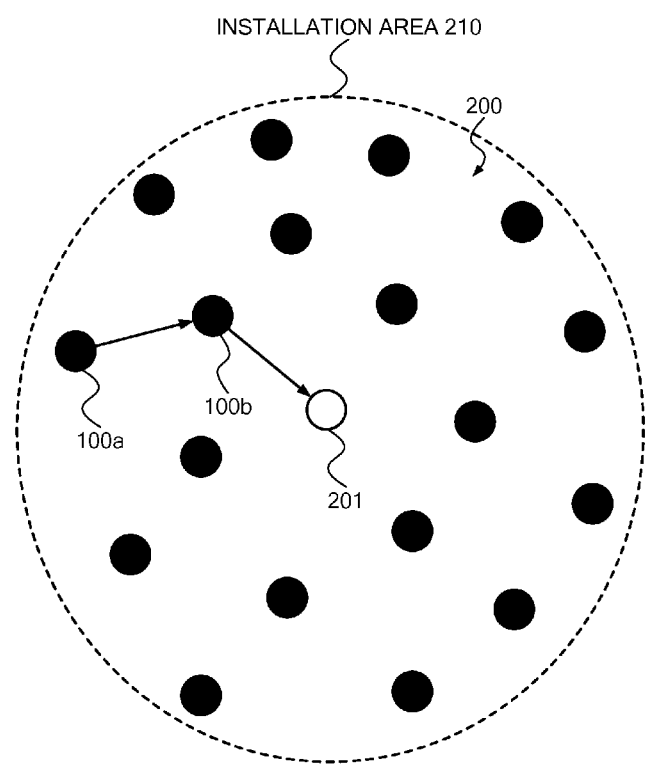
FIG. 2 depicts a configuration example of a sensor network including sensor nodes 100.

FIG. 2 depicts a configuration example of a sensor network including sensor nodes 100. The sensor network 200 depicted in FIG. 2 includes plural chip-shaped sensor nodes 100 arranged in a given installation area 210 and a parent node 201 that receives sensor output from the plural sensor nodes in the installation area 210 wirelessly, etc. The installation area 210 is, for example, a region filled with a substance such as concrete, soil, water, and air. The installation area 210 may be an area in a vacuum state such as cosmic space.

The sensor nodes 100 detect given displacement at the installation sites within the installation area 210 and send information related to the detection to the parent node 201 via wireless communication. The parent node 201 puts together data obtained from the plural sensor nodes 100 disposed in the installation area 210 and uploads the information to a server as an external apparatus. The parent node 201 may notify a user terminal, as an external apparatus, of data detected by the sensor node 100 at an installation site, for example.

A multiplicity of sensor nodes 100 (black circles of FIG. 2) are disposed within the installation area 210 as depicted in FIG. 2. A single parent node 201 (a white circle in FIG. 2) is disposed at a site in the installation area 210. The sensor node 100 of this embodiment has only to have a short-distance wireless communication ability or output radio waves that reach at least the adjacent sensor nodes 100. Therefore, a sensor node 100a far away from the parent node 201 relays and transfers data by way of another or other sensor nodes 100b. Through this relay transfer, each sensor node 100 delivers the detected data to the parent node 201 (see arrows in FIG. 2).

Figure 3:
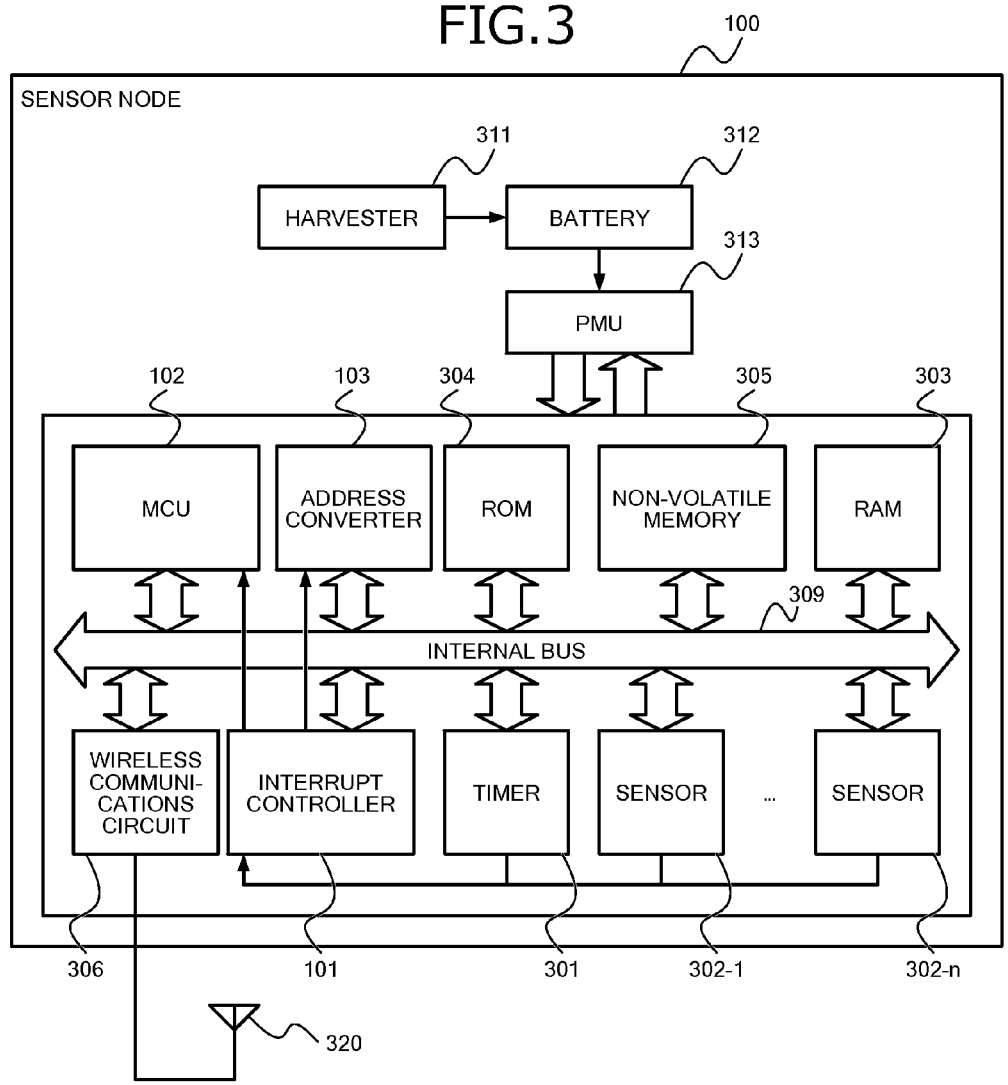
FIG. 3 is a block diagram of an internal configuration example of a sensor node 100.

FIG. 3 is a block diagram of an internal configuration example of the sensor node 100. The sensor node 100 includes a timer 301, plural sensors 302-1 to 302-n (n is a natural number), an interrupt controller 101, an MCU 102, an address converter 103, random access memory (RAM) 303, ROM 304, non-volatile memory 305, and a wireless communications circuit 306. The sensor node 100 includes a harvester 311, a battery 312, and a power management unit (PMU) 313. Hereinafter, an arbitrary sensor is referred to as "sensor 302-i" (i is 1 to n).

An internal bus 309 is disposed to connect the timer 301, the sensors 302-i, the interrupt controller 101, the MCU 102, the address converter 103, the RAM 303, the ROM 304, the non-volatile memory 305, and the wireless communications circuit 306. The internal bus 309 includes the address bus 110 and the data bus 120.

The timer 301 counts a pulse signal generated by a clock (CLK), to measure the elapsed time. The timer 301 generates an event at constant intervals and sends an interrupt signal via a dedicated line to the interrupt controller 101. Hereinafter, the event generated by the timer will be referred to as "event E0".

The sensor 302-i detects a predetermined displacement at the installation site thereof. The sensor 302-i can be, for example, a piezoelectric element that detects a pressure at the installation site or a photoelectric element that detects light. The sensor 302-i generates an event, based on the detected displacement and sends an interrupt signal via the dedicated line to the interrupt controller 101. Hereinafter, the event generated by the sensor 302-i will be referred to as "event Ei" (i is 1 to n).

The interrupt controller 101 receives the interrupt signal via the dedicated line from the timer 301 and the sensor 302-i. When receiving the interrupt signal, the interrupt controller 101 sends to the MPU 313, a request to start power supply to the MCU 102 and the address converter 103 if power the supply to the MCU 102 and the address converter 103 is stopped. When receiving the interrupt signal, the interrupt controller 101 sends a startup request via a dedicated line to the MCU 102 and sends to the address converter 103 by way of a dedicated line, a startup request and type information that indicates the type of event that has occurred.

When receiving the startup request from the interrupt controller 101, the MCU 102 sequentially accesses the logical address from the initial value, to start a boot. By starting the boot, the MCU 102 executes initialization of a device driver and starts batch processing and processing of data of the detection by the sensor 302-i.

By converting a logical address accessed by the MCU 102 into a physical address, the address converter 103 controls the MCU 102 to get a program stored in a storage area indicated by the physical address in the storage 104 such as the ROM 304 and the RAM 303. For example, by converting a logical address into a physical address according to the type of event that has occurred, the address converter 103 controls the MCU 102 to get a program corresponding to the event that has occurred.

The ROM 303 stores transient data of the process performed by the MCU 102. The ROM 304 stores a process program, etc., executed by the MCU 102. The non-volatile memory 305 retains data written thereto even when the power supply is suspended, for example.

The wireless communications circuit (RF) 306 has an antenna 320. The wireless communications circuit 306 outputs a received radio wave as a reception signal and sends a send signal in the form of a radio wave by way of the antenna 320. The antenna 320 sends and receives radio waves for wireless communication with the parent node 201.

The harvester 311 generates electric power, based on variations in energy such as light, vibration, temperature, and radio waves (reception radio wave). The battery 312 stores electric power generated by the harvester 311. The PMU 313 supplies the electric power stored in the battery 312, as a drive power source, to components of the sensor node 100. In other words, the sensor node 100 does not need a secondary battery, an external power source, etc., and internally generates electric power consumed for operation.

For example, consequent to limited electric power accumulated in the battery 312, the sensor node 100 may stop power supply to the MCU 102, the address converter 103, etc., until an event occurs, to thereby reduce power consumption.

Figure 4:
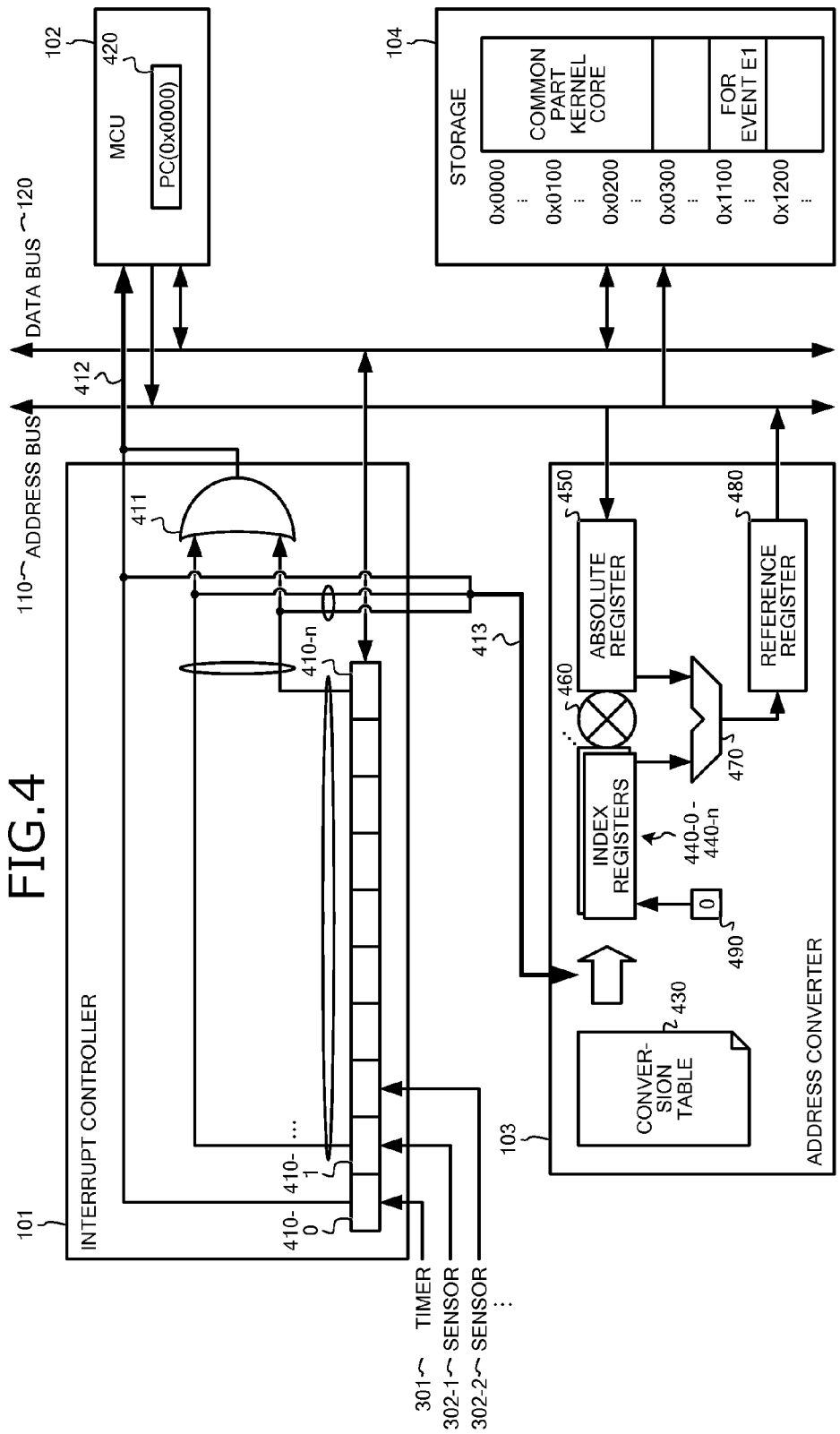
FIG. 4 is an explanatory view of a detailed configuration example of an interrupt controller 101, an address converter 103, and an MCU 102 depicted in FIG. 3.

With reference to FIG. 4, a detailed configuration example will be described of the interrupt controller 101, the address converter 103, and the MCU 102 depicted in FIG. 3.

FIG. 4 is an explanatory view of a detailed configuration example of the interrupt controller 101, the address converter 103, and the MCU 102 depicted in FIG. 3. The interrupt controller 101 has interrupt control registers 410-0 to 410-n and an OR gate 411. Hereinafter, an arbitrary interrupt control register will be referred to as "interrupt control register 410-j" (j is 0 to n).

The interrupt control register 410-j corresponds to various devices (the timer 301 and the sensors 302-i) and stores an interrupt flag indicating the presence or absence of interrupt. For example, the interrupt control register 410-0 corresponds to the timer 301 and stores an interrupt flag indicating the presence or absence of an interrupt consequent to an event E0 caused by the timer 301. The interrupt control register 410-1 corresponds to the sensor 302-1 and stores an interrupt flag indicating the presence or absence of an interrupt consequent to an event E1 generated by the sensor 302-1. Similarly, the interrupt control registers 410-2 to 410-n correspond respectively to the sensors 302-2 to 302-n and store interrupt flags respectively indicating the presence or absence of interrupts consequent to the events E2 to En, respectively.

The interrupt control register 410-j is connected via a dedicated line to a corresponding device. The interrupt flag of the interrupt control register 410-j is set to "interrupt present" by an interrupt signal sent via the dedicated line from the corresponding device. In the interrupt control register 410-j, for example, "0" is set as the interrupt flag in the case of "no interrupt", whereas "1" is set as the interrupt flag in the case of "interrupt present".

When an interrupt flag indicating "interrupt present" is set in the interrupt control register 410-j, the interrupt controller 101 sends to the PMU 313, a request to start power supply to the MCU 102 if no power is supplied to the MCU 102. When an interrupt flag indicating "interrupt present" is set in the interrupt control register 410-*j*, the interrupt controller 101 sends to the PMU 313, a request to start power supply to the address converter 103 if no power is supplied to the address converter 103.

The OR gate 411 is a logic circuit that outputs a logical sum of input signals. The OR gate 411 receives the interrupt flags of the interrupt control registers 410-1 to 410-*n* as input signals and outputs the logical sum thereof. In other words, the OR gate 411 outputs a logical sum "1" if an interrupt flag "1" indicating "interrupt present" is set in at least one of the interrupt control registers 410-1 to 410-*n*.

If the interrupt flag "1" indicating "interrupt present" is set in the interrupt control register 410-0 by the timer 301, the interrupt controller 101 sends the interrupt flag "1" as a startup request to the MCU 102. If the interrupt flag indicating "interrupt present" is set in an interrupt control register 410-*i* by the sensor 302-*i*, the interrupt controller 101 sends the logical sum "1" output from the OR gate 411 as a startup request to the MCU 102. In this case, the startup request is sent by way of a dedicated line 412.

If the interrupt flag indicating "interrupt present" is set in an interrupt control register 410-*j*, the interrupt controller 101 sends interrupt flags of the interrupt control registers 410-0 to 410-*n* as the type information to the address converter 103. In this case, the type information is sent by way of a dedicated line 413.

The MCU 102 has a program counter 420. The program counter 420 is a register that stores a logical address to be accessed. When receiving a startup request from the interrupt controller 101, the MCU 102 outputs a logical address stored in the program counter 420 to the address bus 110. As a result of output of the logical address, the MCU 102 gets and executes a program output to the data bus 120 from the storage 104. The MCU 102 then increments the logical address of the program counter 420 by the program and outputs the logical address stored in the program counter 420 to the address bus 110. In this manner, the MCU 102 sequentially accesses addresses from the initial value of the program counter 420.

The address converter 101 has a conversion table 430, plural index registers 440-0 to 440-*n*, an absolute register 450, a comparator 460, an arithmetic logic unit (ALU) 470, a reference register 480, and an initial value register 490. For example, the address converter 101 may be formed from elements such as an AND gate that is a logical product circuit, an INVERTER gate that is a logical NOT circuit, an OR gate, and a flip flop (FF) that is a latch circuit. The conversion table 430 is a table that stores correspondence information that indicates the correspondence relation between the conversion source logical address and the physical address converted from the logical address, correlated with each of the types of events. The storage content of the conversion table will be described later with reference to FIG. 6.

The plural index registers 440-0 to 440-*n* are registers that store keys of correspondence information to support multiple interrupts. When plural events have occurred, the index registers 440-0 to 440-*n* store keys of correspondence information corresponding respectively to the events, according to the processing order. The index registers 440-0 to 440-*n* may store the correspondence information itself.

The index registers 440-0 to 440-*n* implement stacks, for example, to store keys of correspondence information corresponding respectively to events in last-in first-out (LIFO) structure. Hereinafter, an arbitrary index register will be referred to as "index register 440-*k*". The processing is performed sequentially from correspondence information stored in the index register 440-*k* having a smaller value of k. In the case of not supporting the multiple interrupt, only a single index register 440-*k* may be disposed.

The absolute register 450 is a register that stores a logical address output from the MCU 102 to the address bus 110. The comparator 460 is a logical circuit that determines whether the logical address stored in the absolute register 450 is included in conversion source logical addresses indicated by correspondence information identified by the key stored in the index register 440-0.

The ALU 470 is an arithmetic apparatus that inputs a logical address stored in the absolute register 450 and correspondence information identified by the key stored in the index register 440-0, to calculate a physical address converted from the logical address stored in the absolute register 450. The reference register 480 is a register that stores the physical address calculated by the ALU 470. The initial value register 490 is a register that stores an initial value "0" for initializing the index register 440-*k*.

When receiving type information from the interrupt controller 101, the address converter 103 refers to the conversion table 430 to select correspondence information related to the event type indicated by the received type information. The address converter 103 stores a key of the selected correspondence information into the index register 440-0. The address converter 103 may employ, as the key, a head physical address among the physical addresses converted from the logical addresses.

In a case where another key is stored in the index register 440-0, the address converter 103 shifts the keys stored in the index registers 440-0 to 440-(*n*−1) to the subsequent index registers 440-1 to 440-*n*, respectively. The address converter 103 then stores a key of the selected correspondence information into the index register 440-0.

Thereafter, for example, the address converter 103 gets a logical address output from the MCU 102 to the address bus 110 and stores the logical address into the absolute register 450. Using the comparator 460, the address converter 103 then determines whether the logical address stored in the absolute register 450 is included among conversion source logical addresses indicated by correspondence information identified by the key stored in the index register 440-0.

If the logical address is determined to be included among the conversion source logical addresses, the address converter 103 converts the logical address stored in the absolute register 450 into a physical address, using the ALU 470 and correspondence information identified by the key stored in the index register 440-0. The address converter 103 then stores the physical address into the reference register 480.

The address converter 103 outputs the physical address stored in the reference register 480 to the address bus 110. Thereby, the address converter 103 can control the storage 104 to output to the data bus 120, a program stored in a storage area indicated by the physical address output to the address bus 110.

When the boot of the MCU 102 has terminated, the address converter 103 sets the initial value "0" stored in the initial value register 490 into the index register 440-0 in order to initialize the index register 440-0. If keys are stored in the index registers 440-1 to 440-*n*, the address converter 103 shifts the keys stored in the index registers 440-1 to 440-*n* to the preceding index registers 440-0 to 440-(*n*−1).

Figure 5:
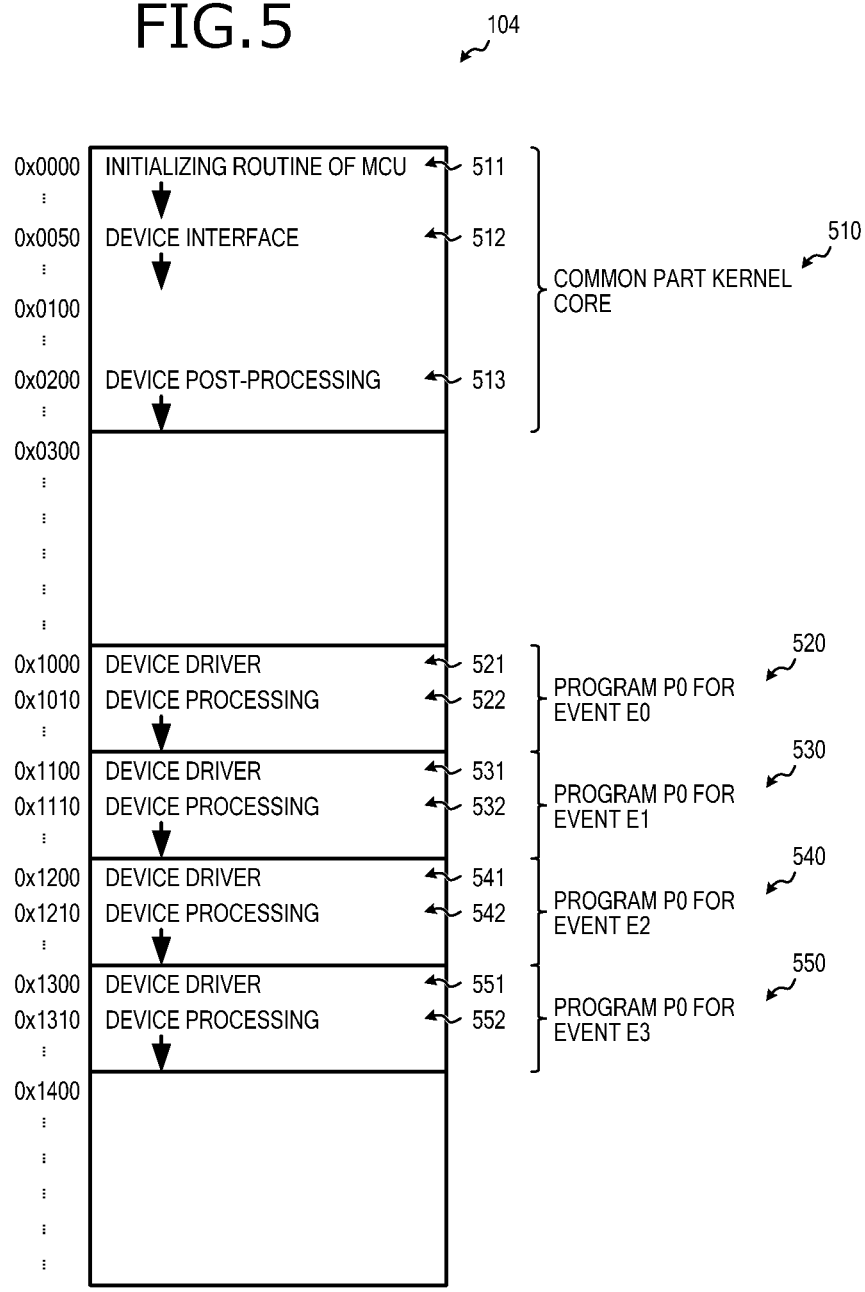
FIG. 5 is a diagram of an example of storage contents of storage 104 depicted in FIG. 4.

With reference to FIG. 5, description will be given of an example of the storage contents of the storage 104 depicted in FIG. 4.

FIG. 5 is a diagram of an example of the storage contents of the storage 104 depicted in FIG. 4. As depicted in FIG. 5, the storage 104 stores, as a program for the boot process of the MCU 102, a common part kernel core to be executed irrespective of the event that has occurred. The common part kernel core includes a program related to an initializing routine of the MCU 102, a program related to a device interface, and a program related to device post-processing.

The common part kernel core is stored in a storage area 510 indicated by physical addresses "0x0000-0x02ff". Of the common part kernel core, the program related to the initializing routine is stored in a storage area 511 indicated by physical addresses "0x0000-0x004f". Of the common part kernel core, the program related to the device interface is stored in a storage area 512 indicated by physical addresses "0x0050-0x00ff". Of the common part kernel core, the program related to the device post-processing is stored in a storage area 513 indicated by physical addresses "0x0200-0x02ff".

The storage 104 stores a program P0 for event E0 to be executed only when the event E0 has been caused by the timer 301. The program P0 includes a program related to a device driver to be initialized when the event E0 has occurred and a program related to device processing to be executed when the event E0 has occurred.

The program P0 is stored in a storage area 520 indicated by physical addresses "0x1000-0x10ff". Of the program P0, the program related to the device driver is stored in a storage area 521 indicated by physical addresses "0x1000-0x100f". Of the program P0, the program related to the device processing is stored in a storage area 522 indicated by physical addresses "0x1010-0x10ff".

The storage 104 stores, for each sensor 302-$i$, a program Pi for event Ei to be executed only when an event Ei has occurred. The program Pi includes a program related to a device driver to be initialized when the event Ei has occurred and a program related to the device processing to be executed when the event Ei has occurred.

For example, a program P1 for event E1 to be executed only when the event E1 has occurred is stored in a storage area 530 indicated by physical addresses "0x1100-0x11ff". Of the program P1, the program related to the device driver is stored in a storage area 531 indicated by physical addresses "0x1100-0x110f". Of the program P1, the program related to the device processing is stored in a storage area 532 indicated by physical addresses "0x1110-0x11ff".

Similarly, a program P2 for event E2 to be executed only when the event E2 has occurred is stored in a storage area 540. A program P3 for event E3 to be executed only when the event E3 has occurred is stored in a storage area 550.

Although the common part kernel core and the programs for events are separately stored, this is not limitative. For example, for each event, a program may be stored in which the common part kernel core is combined with a program for the event.

Figures 6, 7:
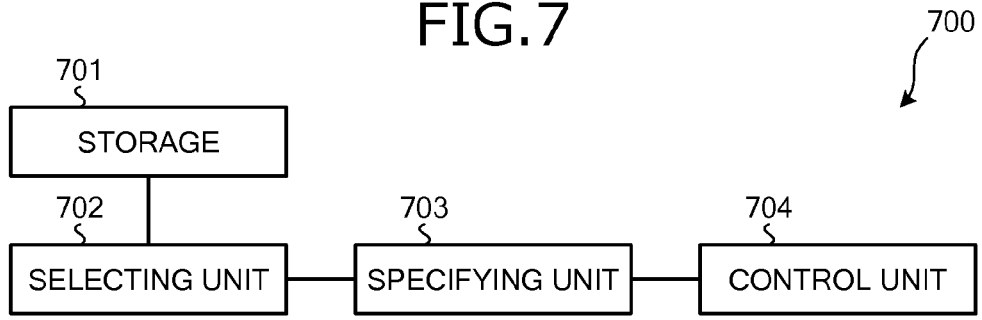
FIG. 6 is a diagram of an example of storage contents of a conversion table 430.
FIG. 7 is a block diagram of a functional configuration example of a converting apparatus.

With reference to FIG. 6, description will be given of an example of the storage contents of the conversion table 430. The conversion table 430 is a table that stores correspondence information that indicates a correspondence relation between a conversion source logical address and a physical address converted from the logical address, for each type of event. The conversion table 430 is realized by the ROM, the RAM, etc., in the address converter 103.

FIG. 6 is a diagram of an example of the storage contents of the conversion table 430. As depicted in FIG. 6, the conversion table 430 has a physical address field and a logical address field, correlated with an event field, forming records (e.g., 601 to 604) in which information is set in each field, for each type of event.

The event field stores type information that indicates the type of event acting as a trigger for the MCU 102 to boot. For example, the event field stores type information "Timer" of an event E0 caused by the timer 301 or stores type information "Event Ei" of an event Ei caused by the sensor 302-$i$.

The physical address field stores, when an event of the type indicated by the event field occurs, physical address information that indicates physical addresses of logical addresses accessed by the MCU 102 for booting. The physical address field stores, for example, a head physical address, among physical addresses converted from the logical addresses.

The logical address field stores, when an event of the type indicated by the event field occurs, logical address information that indicates each of the logical addresses accessed by the MCU 102 for booting. The logical address field stores, for example, a range of the logical addresses.

For example, the record 601 indicates correspondence information related to the event E0 caused by the timer 301. The correspondence information of the record 601 indicates conversion source logical addresses "0x0100-0x01ff" and a head physical address "0x1000" among physical addresses "0x1000-0x10ff" converted from the logical addresses.

In the example depicted in FIG. 6, the logical address group stored in the logical address field corresponding to each event is the same, but this is not limitative. For example, the logical address field may store a different logical address group for each of the events.

With reference to FIG. 7, a functional configuration example of a converting apparatus will be described. FIG. 7 is a block diagram of the functional configuration example of the converting apparatus. A converting apparatus 700 includes a memory unit 701, a selecting unit 720, a specifying unit 703, and a control unit 704.

When the interrupt controller 101 prohibits multiple interrupts, the converting apparatus 700 may execute corresponding actions (hereinafter, referred to as action example 1). When the interrupt controller 101 performs multiple interrupts, the converting apparatus 700 may execute corresponding actions (hereinafter, referred to as action example 2).

Functions to implement the action example 1 of the converting apparatus 700 will first be described. In the action example 1, when detecting the occurrence of an event, the interrupt controller 101 sends a startup request to the processor and sends type information that indicates the type of the event that has occurred to the converting apparatus 700.

Since multiple interrupts are prohibited, in the case of detecting the occurrence of plural events, the interrupt controller 101 waits until the processor finishes booting triggered by a first event in the order of occurrence. After the processor has finished booting triggered by the first event, the interrupt controller 101 sends a startup request to the processor in response to an event that has occurred second and sends to the converting apparatus 700, type information that indicates the type of event that has occurred second.

The processor is an apparatus that controls the actions of the sensor node 100 overall and corresponds to the MCU 102, for example. As described in FIG. 1, an event is a trigger that causes the processor to boot and to run a program corresponding to the event. The event is, for example, the event E0 caused by the timer 301 or an event Ei caused by the sensor 302-$i$. The startup request is a request that causes the processor to start booting. The converting apparatus 700 is an apparatus that converts a logical address to a physical address and corresponds to the address converter 103, for example.

The memory unit 701 stores correspondence information that indicates a correspondence relation between logical addresses accessed by the processor for its boot and physical addresses converted from the logical addresses, correlated with each type of event booting the processor. As used herein, accessing a logical address by the processor means that the processor outputs a logical address to the address bus 110 and sends to the address converter 103, a request to read the storage 104.

The logical addresses accessed for booting means a logical address group accessed by the processor for booting in a logical address space accessible by the processor and means a logical address group accessed sequentially from the initial value thereof. The logical addresses accessed for booting are, for example, a logical address group "0x0000-0x02ff" from a logical address initial value "0x0000" to a logical address "0x02ff" where a termination process is stored.

The memory unit 701 stores for example first correspondence information, correlated with the types of events. The first correspondence information indicates a correspondence relation between logical addresses specific to the type of event among the logical addresses and physical addresses that are addresses converted from the logical addresses and indicate a storage area of a program specific to the type of event in the storage device. The first correspondence information is for example correspondence information stored in the conversion table 430 described with reference to FIG. 6.

The logical addresses specific to the type of event among the logical addresses are, for example, a conversion source logical address group "0x0100-0x01ff" of a physical address group where a program is stored that is specific to the event E0 caused by the timer 301 in FIG. 5. The logical addresses specific to the type of event are set and stored in the physical address field of the record 601 depicted in FIG. 6, for example.

The physical addresses indicative of a storage area of a program specific to the type of event refer, for example, to a physical address group "0x1000-0x10ff" where a program is stored that is specific to the event E0 caused by the timer 301 depicted in FIG. 5. The physical addresses indicating a storage area of a program specific to the type of event are set and stored in the logical address field of the record 601 depicted in FIG. 6, for example.

The memory unit 701 stores second correspondence information. The second correspondence information indicates a correspondence relation between logical addresses common to the types of events and among the logical addresses and physical addresses that are addresses converted from the common logical addresses and indicate a storage area of a program common to the types of events in the storage device. The second correspondence information is, for example, information that indicates a correspondence relation between a logical address and a physical address that are stored in a page table according to a conventional technique.

The logical addresses common to the types of events are, for example, a conversion source logical address group "0x0000-0x00ff, 0x0200-0x02ff" of the physical address group where the common part kernel core is stored as depicted in FIG. 5. The physical addresses indicative of a storage area of a program specific to the type of event are, for example, a physical address group "0x0000-0x00ff, 0x0200-0x02ff" where the common part kernel core is stored as depicted in FIG. 5.

The memory unit 701 is realized by, for example, the conversion table 430 stored in the ROM, RAM, etc., of the address converter 103. This enables the selecting unit 702 to refer to the memory unit 701 to select correspondence information related to the type of event that has occurred.

When an event occurs, the selecting unit 702 refers to the memory unit 701 to select correspondence information related to the type of event that has occurred. The selecting unit 702 refers to the conversion table 430, for example, to select correspondence information related to the type indicated by the type information received from the interrupt controller 101. The selecting unit 702 then stores into a register, identification information identifying the selected correspondence information.

The identification information is a key of correspondence information and is, for example, the head physical address. The register is, for example, the index register 440-0. The selecting unit 702 may store the selected correspondence information itself into the register. The selecting unit 702 has only to select the correspondence information before the MCU 102 accesses a conversion source logical address and need not select the correspondence information immediately after an event has occurred. Thus, the selecting unit 702 selects in advance correspondence information used for the conversion of the logical address before the MCU 102 accesses the conversion source logical address. The selecting unit 702 is implemented by the index register 440-$k$ for example.

When the processor accesses a logical address included in the logical addresses in response to occurrence of an event, the specifying unit 702 specifies a physical address converted from the logical address accessed by the processor, using the correspondence information selected by the selecting unit 702. For example, when the processor accesses a logical address included in logical addresses specific to the type of event that has occurred, the specifying unit 703 specifies a physical address converted from the logical address accessed by the processor, using the first correspondence information corresponding to that type.

For example, when the MCU 102 accesses a logical address "0x0100" of a logical address group "0x0100-0x01ff", the specifying unit 703 gets correspondence information corresponding to the event E0 caused by the timer 301. At this time, for example, the specifying unit 703 identifies correspondence information to be gotten, using a key stored in the index register 440-0 by the selecting unit 702.

The specifying unit 703 then specifies a difference "0" from the head logical address "0x0100" of the logical address group indicated by the correspondence information to the logical address "0x0100" accessed by the MCU 102. The specifying unit 703 then adds the specified difference "0" and a head physical address "0x1000" indicated by the correspondence information, to specify a physical address "0x1000 (0x1000+0)" of the logical address "0x0100" accessed by the MCU 102.

When the processor accesses a logical address included in the common logical addresses, the specifying unit 703 specifies a physical address of a logical address assessed by the processor, using the second correspondence information. For example, when the MCU 102 accesses a logical address of a logical address group "0x0000-0x00ff", the specifying unit 703 specifies a physical address using the page table.

The specifying unit 703 retains the specified physical address in the reference register 480. This enables the specifying unit 703 to specify a storage area of a program gotten by the MCU 102. The specifying unit 703 is realized by, for example, the index register 440-$k$, the absolute register 450, the comparator 460, the ALU 470, and the reference register 480.

The control unit 704 controls the processor to get a program stored in a storage area in the storage device indicated by a physical address specified by the specifying unit 703. For example, the control unit 704 outputs a physical address specified by the specifying unit 703 to the address bus 110 and sends to the storage 104, a request to output to the data bus 120, a program in a storage area indicated by the physical address on the address bus 110.

The control unit 704 is realized by the reference register 480, for example. Thereby, the storage 104 outputs to the data bus 120, the program stored in the storage area indicated by the physical address. On the other hand, the MCU 102 gets from the data bus 120, the program stored in the storage area in the storage device indicated by the physical address specified by the converting apparatus 700, to run the program. This enables the MCU 102 to boot to run the program specific to the event that has occurred. The control unit 704 is implemented by the reference register 480, for example.

Description will next be given of a function of implementing the action example 2 of the converting apparatus 700. In the action example 2, when detecting occurrence of a new event before the termination of the boot of the processor, triggered by the event that occurred in the past, the interrupt controller 101 controls the MCU 102 to stop the boot and start a boot triggered by the event that has newly occurred. The interrupt controller 101 then controls the MCU 102 to start from the beginning of the boot triggered by the event that occurred in the past, after the termination of the boot of the processor triggered by the event that has newly occurred.

In a case where priorities are assigned to events, the interrupt controller 101 may control the MCU 102 to start a boot triggered by an event in descending order of priorities. For example, if an event occurs having a higher priority than that of the event currently booting the MCU 102, the interrupt controller 101 may control the MCU 102 to stop the current boot and instead start a boot by the event having a higher priority. After completion of the boot of the processor by the event having a higher priority, the interrupt controller 101 may control the MCU 102 to start from the beginning of a boot by the event, the event by which the boot has been stopped.

The action example 2 will be described by way of an example where the interrupt controller 101 controls the MCU 102 to preferentially execute a boot triggered by an event that has newly occurred. Since the functions of the memory unit 701 and the control unit 704 according to the action example 2 are similar to those of the memory unit 701 and the control unit 704 according to the action example 1, description thereof will not again be made.

When a first event occurs booting the processor, the selecting unit 702 refers to the memory unit 701 to select correspondence information related to the type of the first event. If before the completion of the boot of the processor triggered by occurrence of the first event, a second event occurs booting the processor and having higher priority than the first event, the selecting unit 702 refers to the memory unit 701 to select correspondence information related to the type of the second event. In this case, the first event is an event that occurred in the past and is, for example, the event E0 caused by the timer 301. The second event is an event that has occurred after the occurrence of the first event and is, for example, the event E1 generated by the sensor 302-1.

For example, when the interrupt controller 101 detects the occurrence of the event E0 from the timer 301, the selecting unit 702 selects correspondence information (e.g., correspondence information of the record 601 depicted in FIG. 6) related to the type information of the event E0 sent from the interrupt controller 101. The selecting unit 702 then keeps a key of the selected correspondence information in the index register 440-0.

Thereafter, when the interrupt controller 101 detects the occurrence of the event E1 from the sensor 302-1, the selecting unit 702 selects correspondence information (e.g., correspondence information of the record 602 depicted in FIG. 6) related to the type information of the event E1 sent from the interrupt controller 101. At this time, to hold a key in the index register 440-0, the selecting unit 702 shifts keys held in the index registers 440-0 to 440-($n$−1) to the following index registers 440-1 to 440-$n$, respectively. The selecting unit 702 then keeps a key of the selected correspondence information in the index register 440-0.

The specifying unit 703 waits for access by the processor to a logical address included in the logical addresses corresponding to the second event as a result of the occurrence of the second event. When the processor accesses a logical address included among the logical addresses corresponding to the second event, the specifying unit 703 specifies a physical address converted from the logical address accessed by the processor, using correspondence information related to the type of the second event.

After the completion of a boot of the processor triggered by the occurrence of the second event, the specifying unit 703 waits for access by the processor to a logical address included in the logical addresses corresponding to the first event as a result of the occurrence of the first event. When the processor accesses a logical address included in the logical addresses corresponding to the first event, the specifying unit 703 specifies a physical address converted from the logical address accessed by the processor, using correspondence information related to the type of the first event.

For example, when the MCU 102 boots consequent to the occurrence of the event E1, the specifying unit 703 specifies a physical address from the logical address, using correspondence information identified by a key stored in the index register 440-0. After the completion of the boot of the MCU 102 triggered by the occurrence of the event E1, the specifying unit 703 shifts keys stored in the index registers 440-1 to 440-$n$ to the preceding index registers 440-0 to 440-($n$−1). Using correspondence information identified by a key stored in the index register 440-0, the specifying unit 703 then specifies a physical address from a logical address accessed by the MCU 102 that has again started to boot.

With reference to FIGS. 8 to 17, description will be given of a content example 1 of activation of the MCU 102 in the sensor node 100. FIGS. 8 to 17 depict a case where the address converter 103 in the sensor node 100 operates as in the action example 1.

Figure 8:
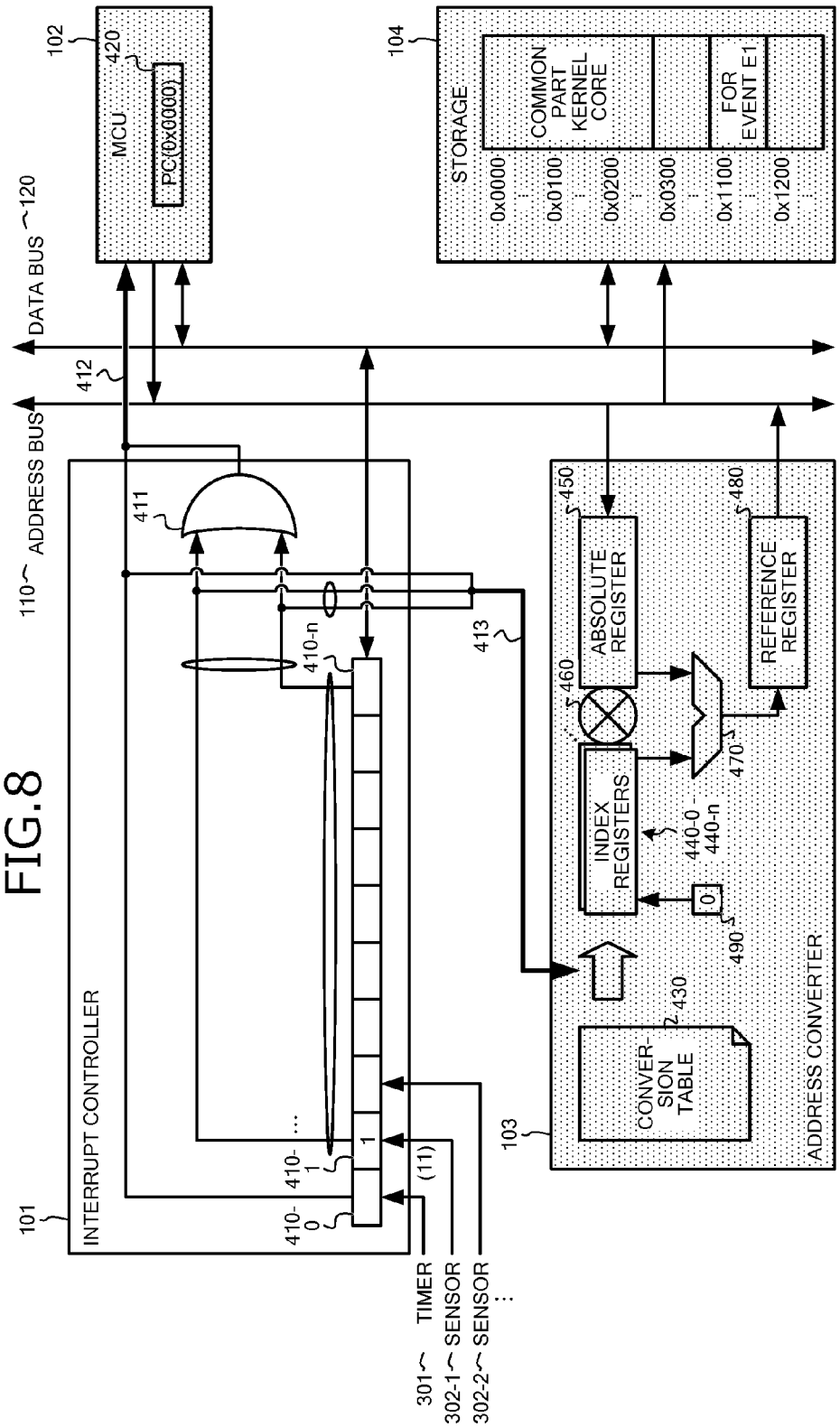
FIGS. 8, 9, 10, 11, 12, 13, 14, 15, 16, and 17 are explanatory views of a content example 1 of activation of the MCU 102 in the sensor node 100.

FIGS. 8, 9, 10, 11, 12, 13, 14, 15, 16, and 17 are explanatory views of the content example 1 of activation of the MCU 102 in the sensor node 100. In FIG. 8, to reduce the power consumption, no power is supplied to the address converter 103, the MCU 102, and the storage 104 in the sensor node 100.

(11) A sensor 302-1 sends an interrupt signal via a dedicated line to the interrupt control register 410-1 of the interrupt controller 101. As a result, an interrupt flag "1" indicative of "interrupt present" is set in the interrupt control register 410-1. Description will be given with reference to FIG. 9.

Figure 9:
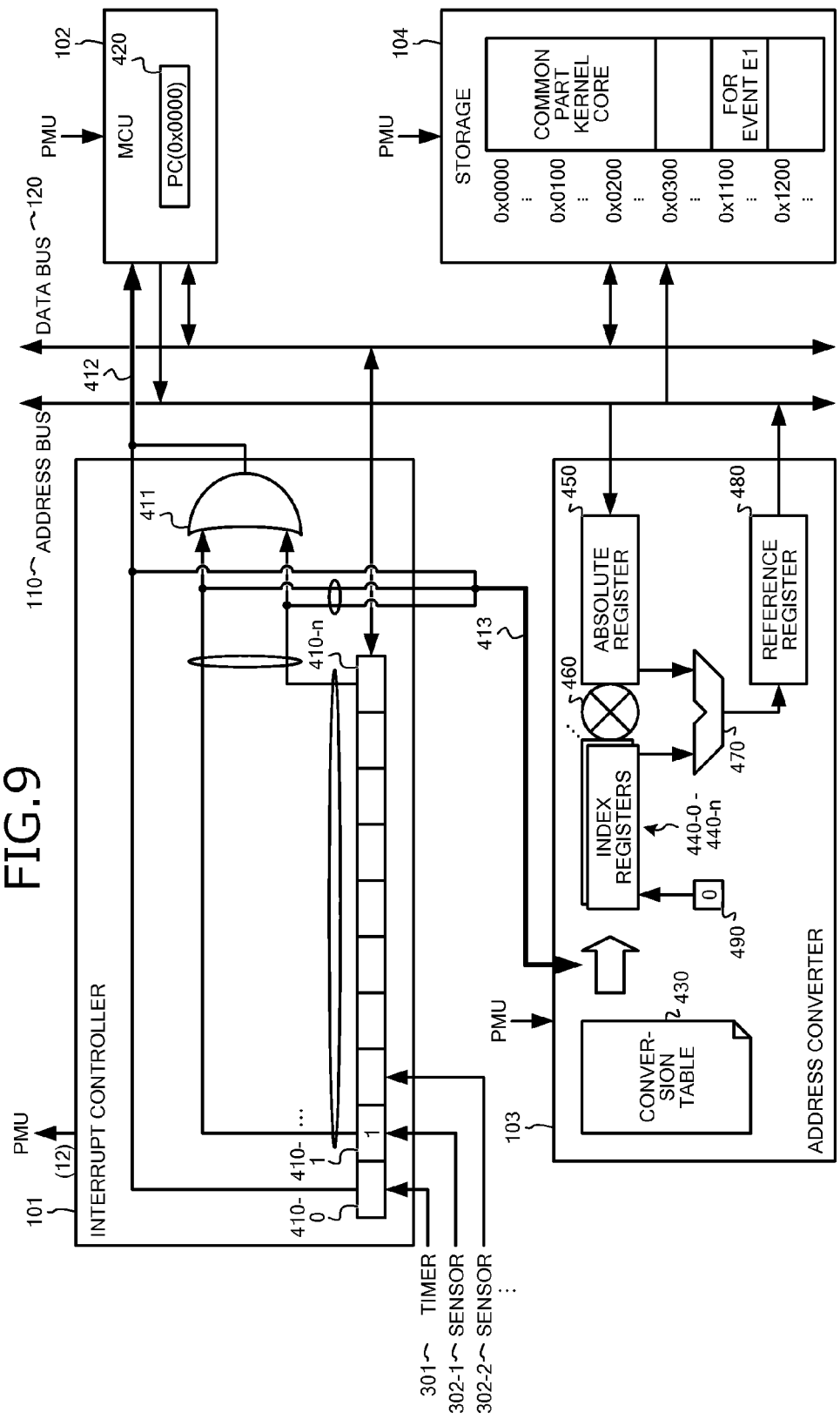

In FIG. 9, (12) due to the setting of the interrupt flag "1" in the interrupt control register 410-1, the interrupt controller 101 sends to the PMU 313, a request to start power supply to the address converter 103, the MCU 102, and the storage 104. As a result, power supply is started to the address converter 103, the MCU 102, and the storage 104. Description will be given with reference to FIG. 10.

Figure 10:
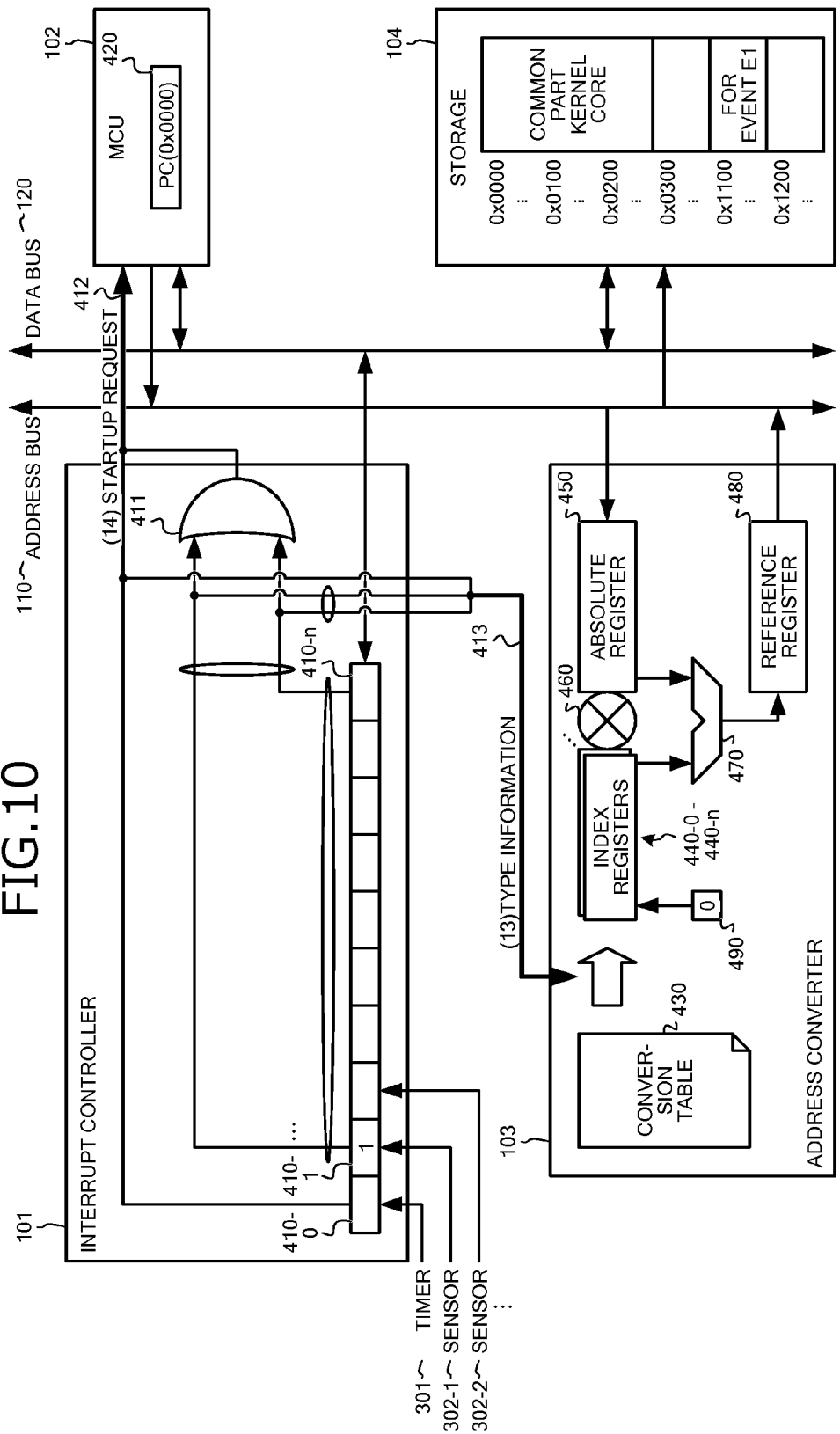

In FIG. 10, (13) the interrupt controller 101 sends type information that indicates the type of occurring event to the address converter 103 supplied with power. (14) The interrupt controller 101 sends a startup request to the MCU 102 supplied with power. Description will be given with reference to FIG. 11.

Figure 11:
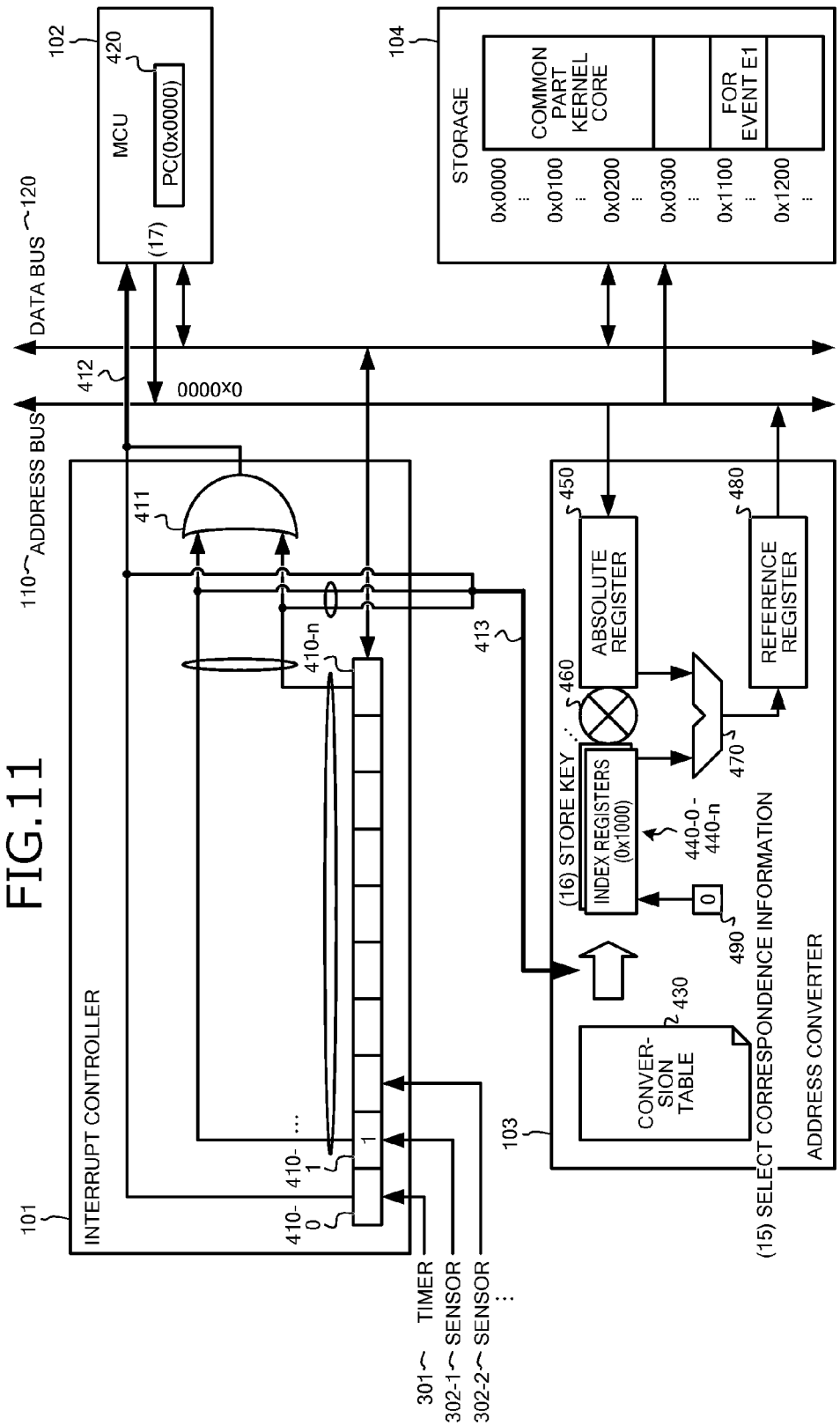

In FIG. 11, (15) the address converter 103 refers to the conversion table 430 to select correspondence information related to the type indicated by the type information. (16) The address converter 103 then retains in the index register 440-0, the head physical address "0x1000" indicated by the selected correspondence information as a key for identifying the selected correspondence information. (17) The MCU 102 starts to boot and outputs to the address bus 110, an initial value "0x0000" of the logical address stored in the program counter 420. Description will with be given with reference to FIG. 12.

Figure 12:
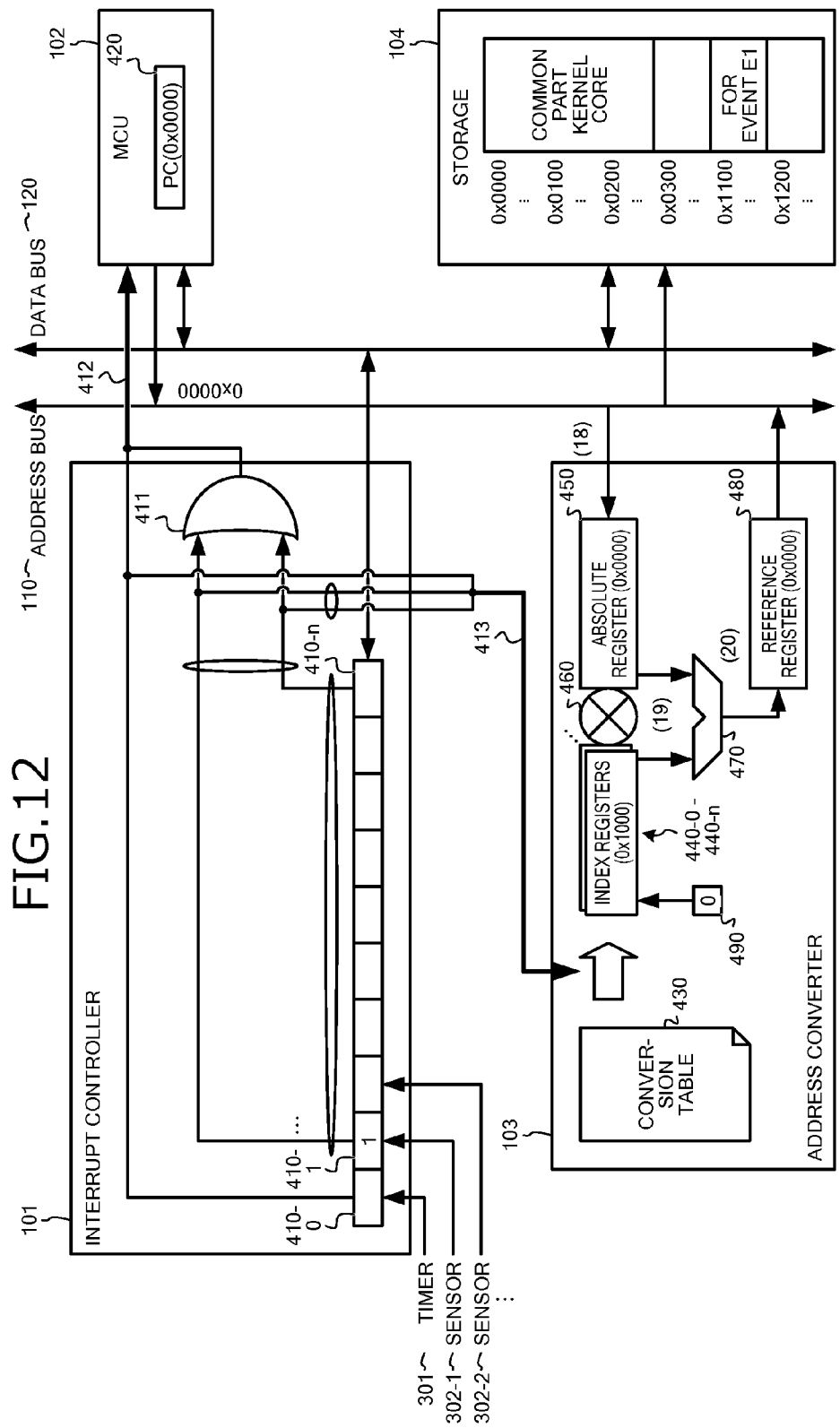

In FIG. 12, (18) the address converter 103 gets the logical address "0x0000" output from the MCU 102 to the address bus 110 and stores the logical address "0x0000" into the absolute register 450.

(19) The address converter 103 then specifies a conversion source logical address group indicated by correspondence information identified by using, as a key, a physical address "0x1000" stored in the index register 440-0. The address converter 103 then determines whether the logical address "0x0000" stored in the absolute register 450 is included in the specified conversion source logical address group.

(20) Since the logical address "0x0000" is not included in the conversion source logical address group, the address converter 103 converts the logical address "0x0000" into a physical address "0x0000", using the page table according to a conventional technique and stores the physical address into the reference register 480. Description will be given with reference to FIG. 13.

Figure 13:
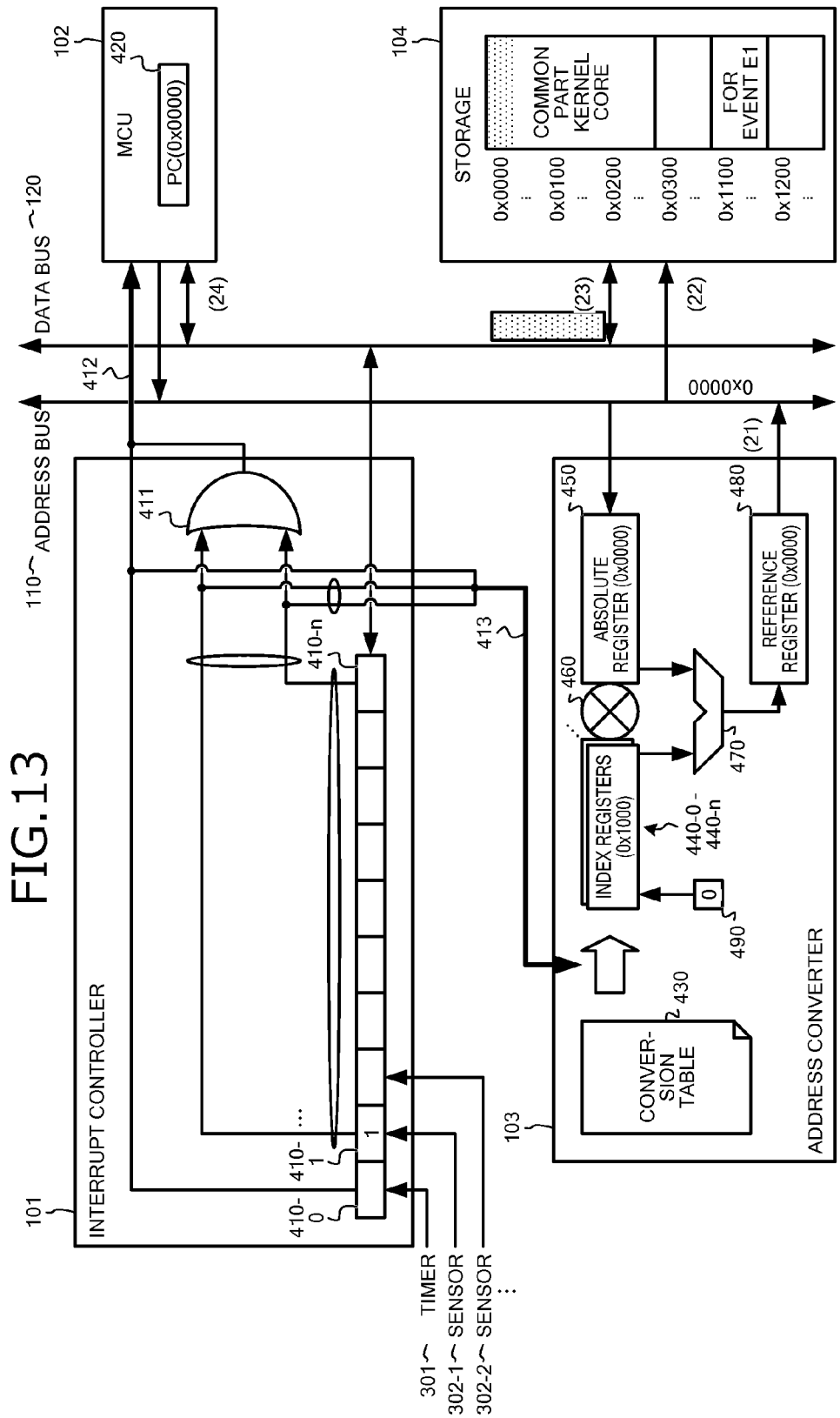

In FIG. 13, (21) the address converter 103 outputs the physical address "0x0000" stored in the reference register 480 to the address bus 110. (22) The storage 104 gets the physical address "0x0000" output to the address bus 110. (23) The storage 104 then outputs to the data bus 120, a common part kernel core stored in a storage area indicated by the physical address "0x0000". (24) The MCU 102 gets the common part kernel core output to the data bus 120. Description will be given with reference to FIG. 14.

Figure 14:
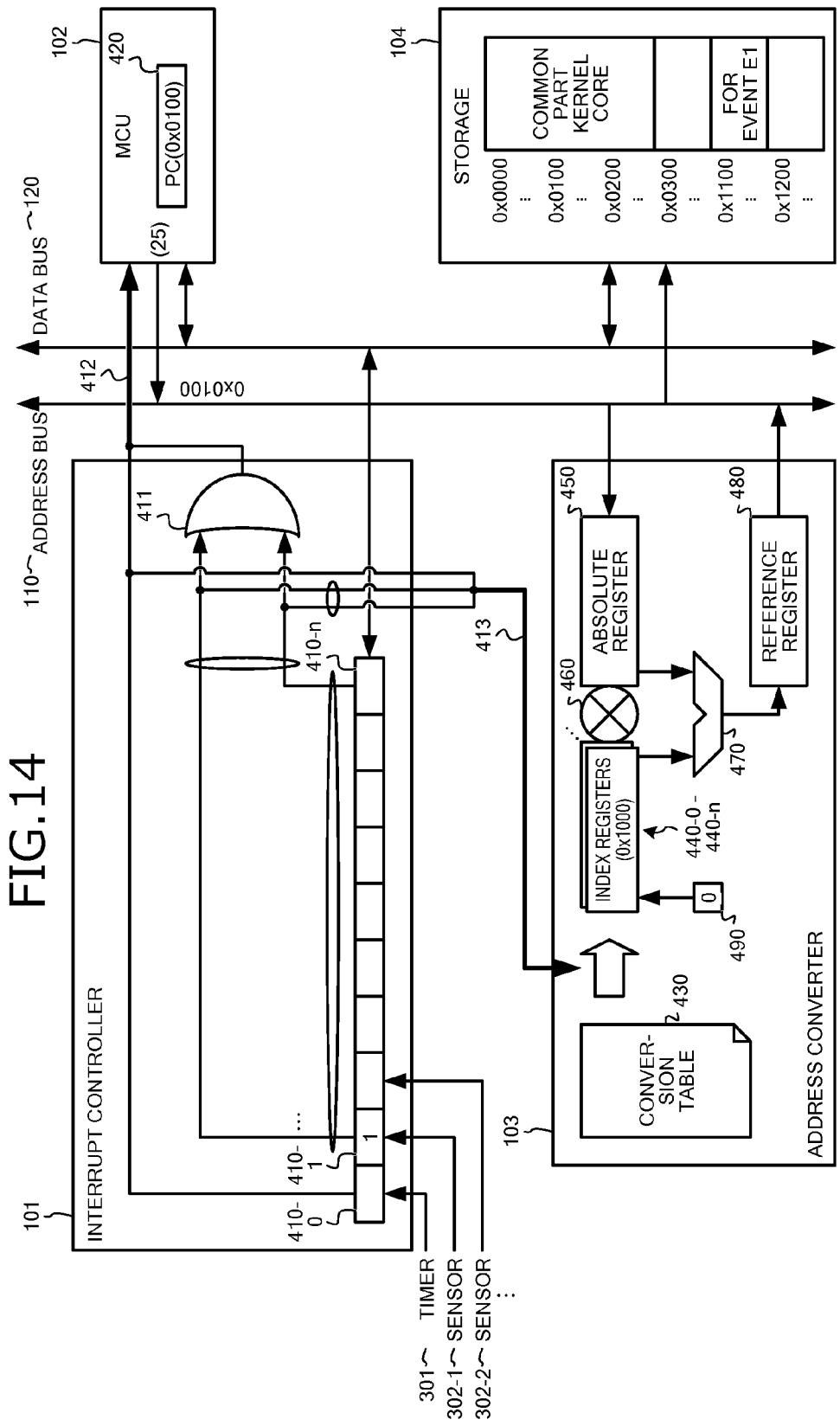

In FIG. 14, (25) the MCU 102 increments the program counter 420 and gets a program in the same manner as at (11) to (24). Thereafter, the MCU 102 increments the program counter 420 in sequence and further gets programs. Assuming that the logical address of the program counter 420 has resulted in "0x0100" by the incrementing, description will be given with reference to FIG. 15.

Figure 15:
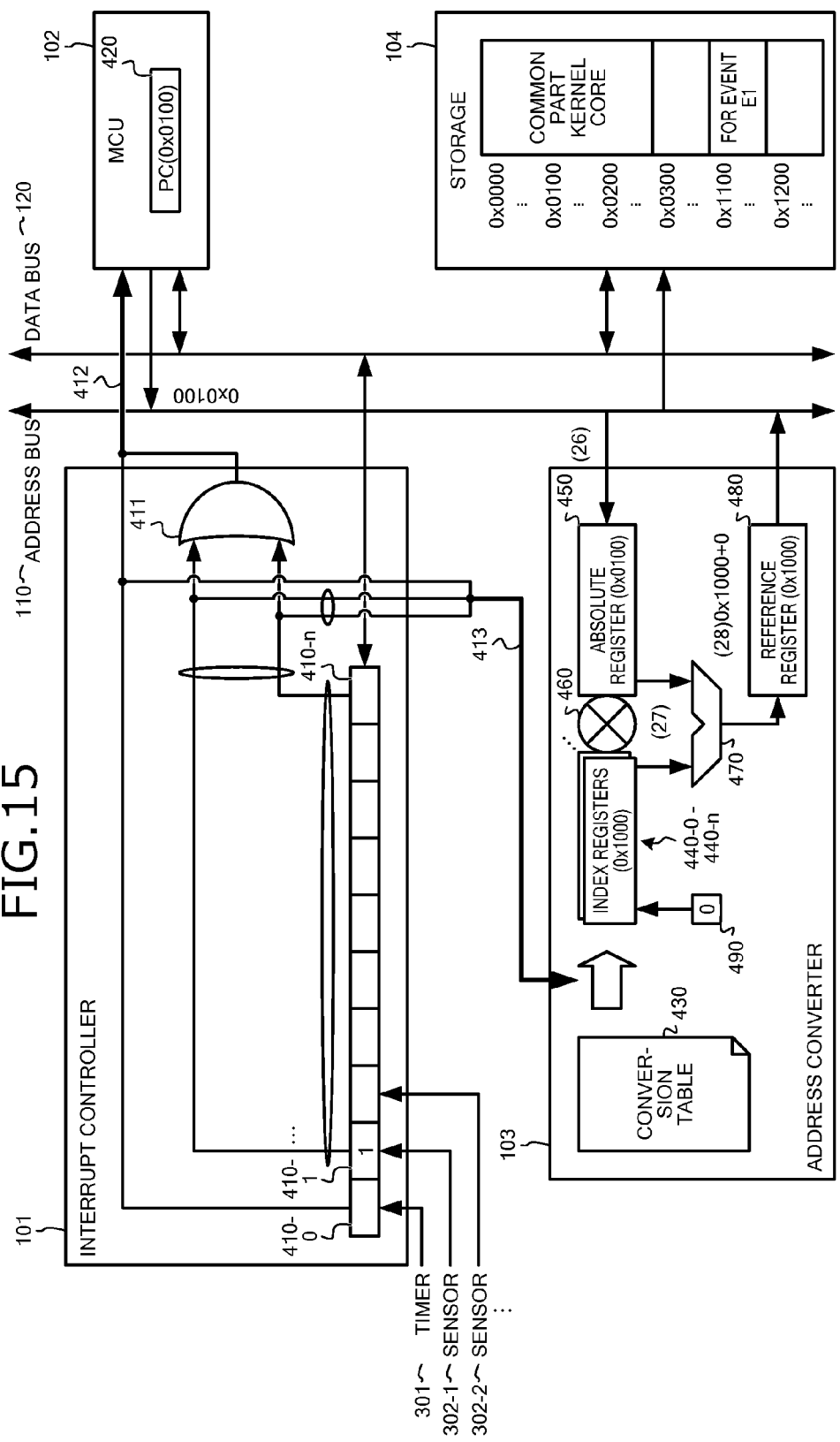

In FIG. 15, the MCU 102 outputs the logical address "0x0100" of the program counter 420 to the address bus 110. (26) The address converter 103 gets the logical address "0x0100" output from the MCU 102 to the address bus 110 and stores the logical address "0x0100" into the absolute register 450.

(27) The address converter 103 then specifies a conversion source logical address group "0x0100 to 0x01ff" indicated by correspondence information identified by using, as a key, the physical address "0x1000" stored in the index register 440-0. The address converter 103 then determines whether the logical address "0x0100" stored in the absolute register 450 is included in the specified conversion source logical address group "0x0100 to 0x01ff".

(28) Since the logical address "0x0100" is included in the conversion source logical address group, the address converter 103 converts the logical address "0x0100" into a physical address "0x1000" and stores the physical address into the reference register 480.

For example, the address converter 103 specifies a difference "0" from the head logical address "0x0100" of the conversion source logical address group to the logical address "0x0100" stored in the absolute register 450. The address converter 103 then adds the difference "0" to the head physical address "0x1000" stored in the index register 440-0. The address converter 103 then stores the post-addition physical address "0x1000" into the reference register 480. Description will be given with reference to FIG. 16.

Figure 16:
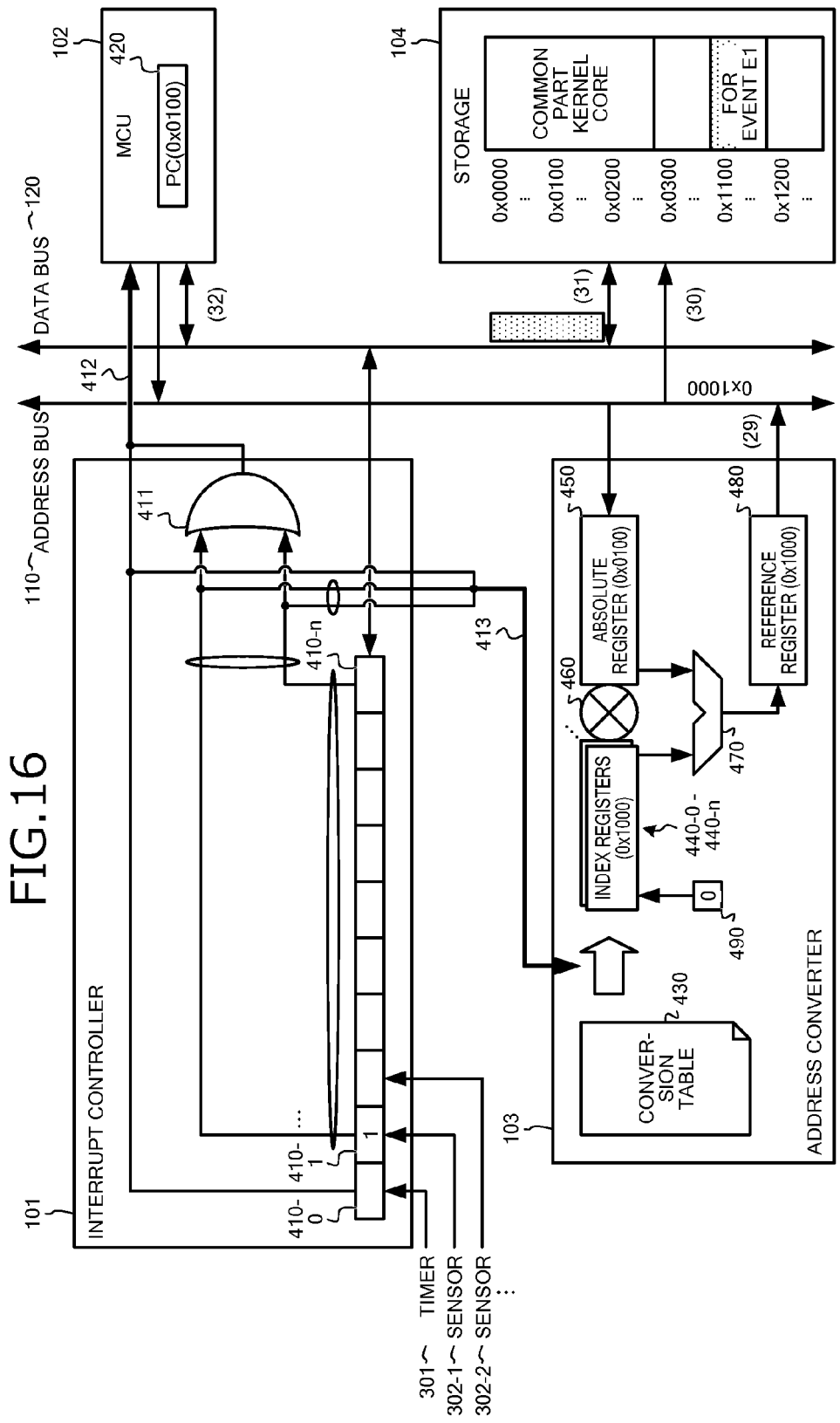

In FIG. 16, (29) the address converter 103 outputs the physical address "0x1000" stored in the reference register 480 to the address bus 110. (30) The storage 104 gets the physical address "0x1000" output to the address bus 110.

(31) The storage 104 then outputs to the data bus 120, a program P1 for the event E1 stored in the storage area indicated by the physical address "0x1000". (32) The MCU 102 gets the program P1 for the event E1, output to the data bus 120. Description will be given with reference to FIG. 17.

Figure 17:
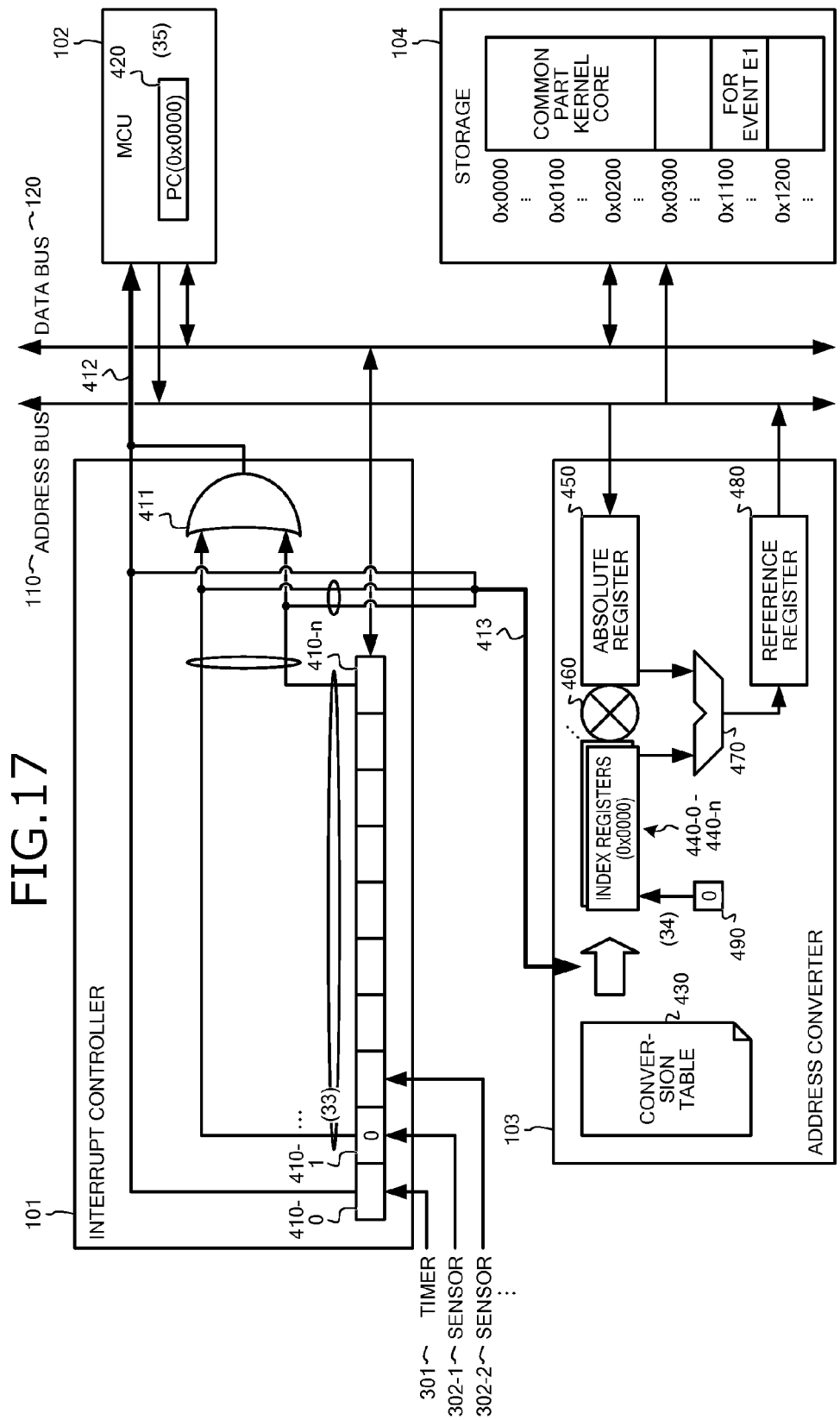

In FIG. 17, it is assumed that the MCU 102 has finished booting. (33) When the MCU 102 has finished booting, the interrupt controller 101 stores an interrupt flag "0" indicating "no interrupt" into the interrupt control register 410-1.

(34) When the MCU 102 has finished booting, the address converter 103 sets an initial value "0" into the index register 440-0 to initialize the index register 440-0. (35) When finished booting, the MCU 102 initializes the program counter 420.

In this case, to reduce power consumption, when the MCU 102 has finished booting, the interrupt controller 101 may send to the PMU 313, a request to stop power supply to the address converter 103, the MCU 102, and the storage 104.

This enables the MCU 102 to execute a program corresponding to the type of the occurring event, by sequentially accessing logical addresses from the initial value of the logical addresses, without executing the branch processing for running a program corresponding to the type of the occurring event. As a result, the MCU 102 can curtail the branch processing to reduce the startup period.

Since the MCU 102 can curtail the branch processing, the storage 104 need not store a program related to branch processing. Thus, the storage 104 can curtail the program related to the branch processing and thereby, suppress memory usage.

Figure 18:
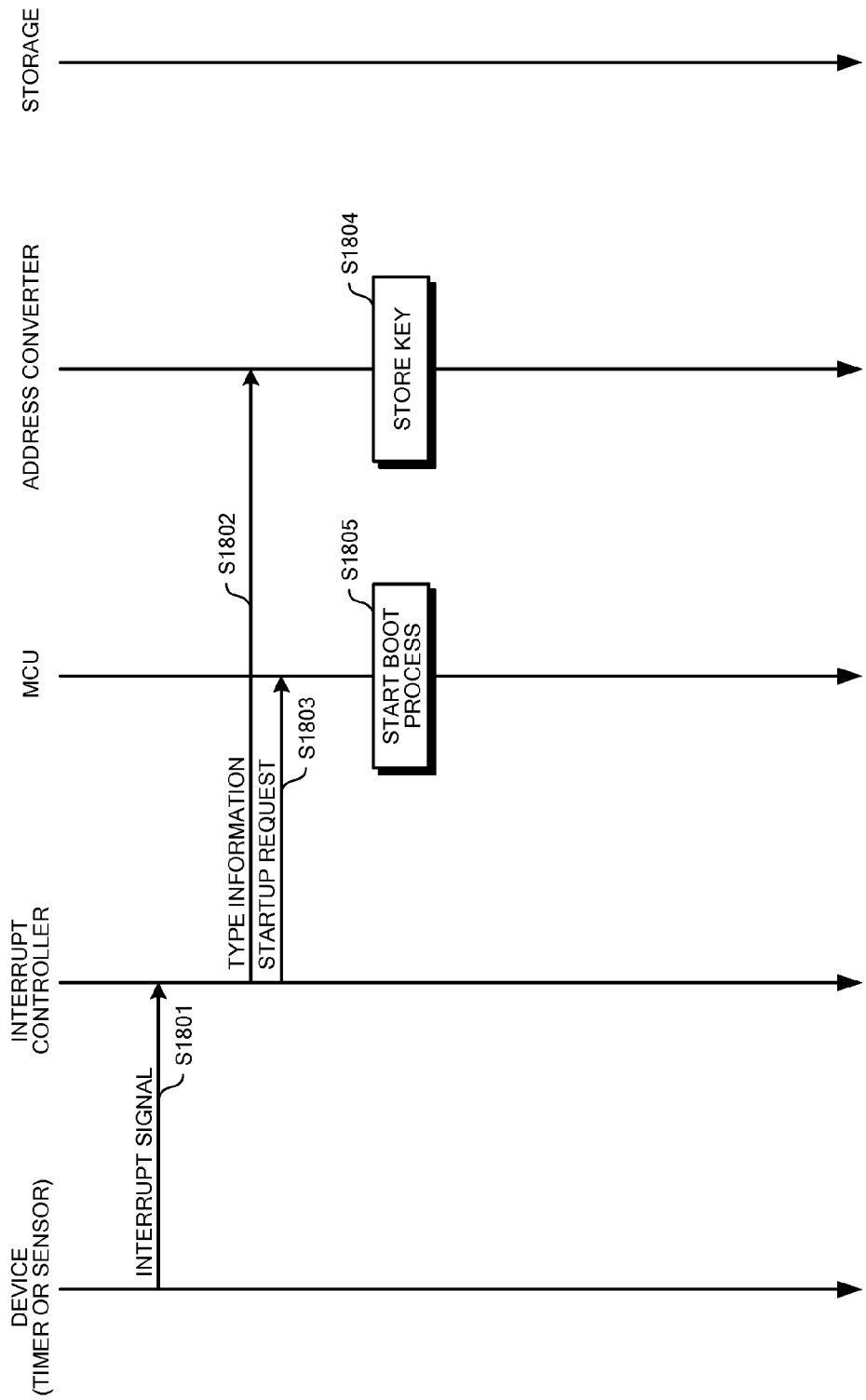
FIG. 18 is a sequence diagram of an example of a procedure of an MCU startup process in the sensor node 100.

With reference to FIG. 18, description will be given of an example of the procedure of the MCU startup process in the sensor node 100. The MCU startup process depicted in FIG. 18 represents a process procedure of the interrupt controller 101, the MCU 102, and address converter 103 described with reference to FIGS. 8 to 17.

FIG. 18 is a sequence diagram of an example of the procedure of the MCU startup process in the sensor node 100. In FIG. 18, when a device (the timer 301 or the sensor 302-i) detects the occurrence of an event, the device sends an interrupt signal to the interrupt controller 101 (step S1801).

When the interrupt controller 101 receives the interrupt signal from the sensor 302-i, the interrupt controller 101 sends type information that indicates the type of event to the address converter 103 (step S1802). When the interrupt controller 101 receives the interrupt signal from the sensor 302-i, the interrupt controller 101 sends a startup request to the MCU 102 (step S1803).

When the address converter 103 receives the type information from the interrupt controller 101, the address converter 103 refers to the conversion table 430 to select correspondence information related to the type indicated by the received type information and stores a key of the selected correspondence information into the index register 440-0 (step S1804). The MCU 102 starts a boot process (step S1805). The boot process at step S1805 will be described later with reference to FIG. 19.

Figure 19:
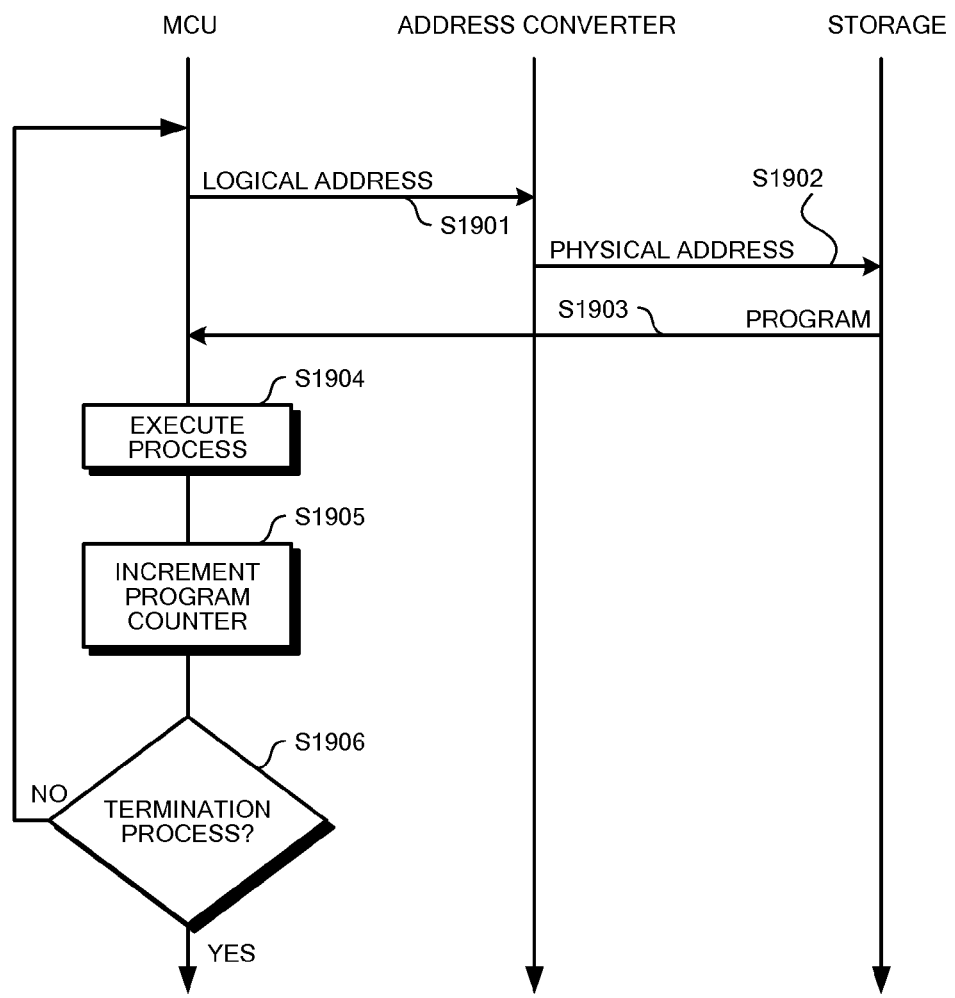
FIG. 19 is a sequence diagram of an example of a procedure of a boot process in the MCU 102 performed at step S1805.

With reference to FIG. 19, description will be given of an example of a procedure of the boot process that the MCU 102 starts at step S1805.

FIG. 19 is a sequence diagram of an example of the procedure of the boot process in the MCU 102 performed at step S1805. In FIG. 19, first, the MCU 102 outputs to the address bus 110, a logical address stored in the program counter 420 (step S1901).

Next, the address converter 103 gets the logical address output to the address bus 110. The address converter 103 converts the logical address into a physical address. The address converter 103 outputs the resultant physical address to the address bus 110 (step S1902).

The storage 104 gets the physical address output to the address bus 110. The storage 104 then outputs to the data bus 120, a program stored in a storage area indicated by the physical address (step S1903).

The MCU 102 gets the program output to the data bus 120. The MCU 102 then executes a process according to the program (step S1904). The MCU 102 increments the program counter 420 (step S1905).

The MCU 102 determines whether the process executed at S1904 is a termination process (step S1906). If the process is not the termination process (step S1906: NO), the MCU 102 returns to step S1901.

On the other hand, if the process is the termination process (step S1906: YES), the MCU 102 terminates the boot process. This enables the MCU 102 to execute the boot process by accessing sequentially from the initial value of the logical address.

With reference to FIGS. 20 to 27, description will be given of a content example 2 of activation of the MCU 102 in the sensor node 100. FIGS. 20 to 27 depict a case where the address converter 103 in the sensor node 100 operates as in the action example 2.

Figure 20:
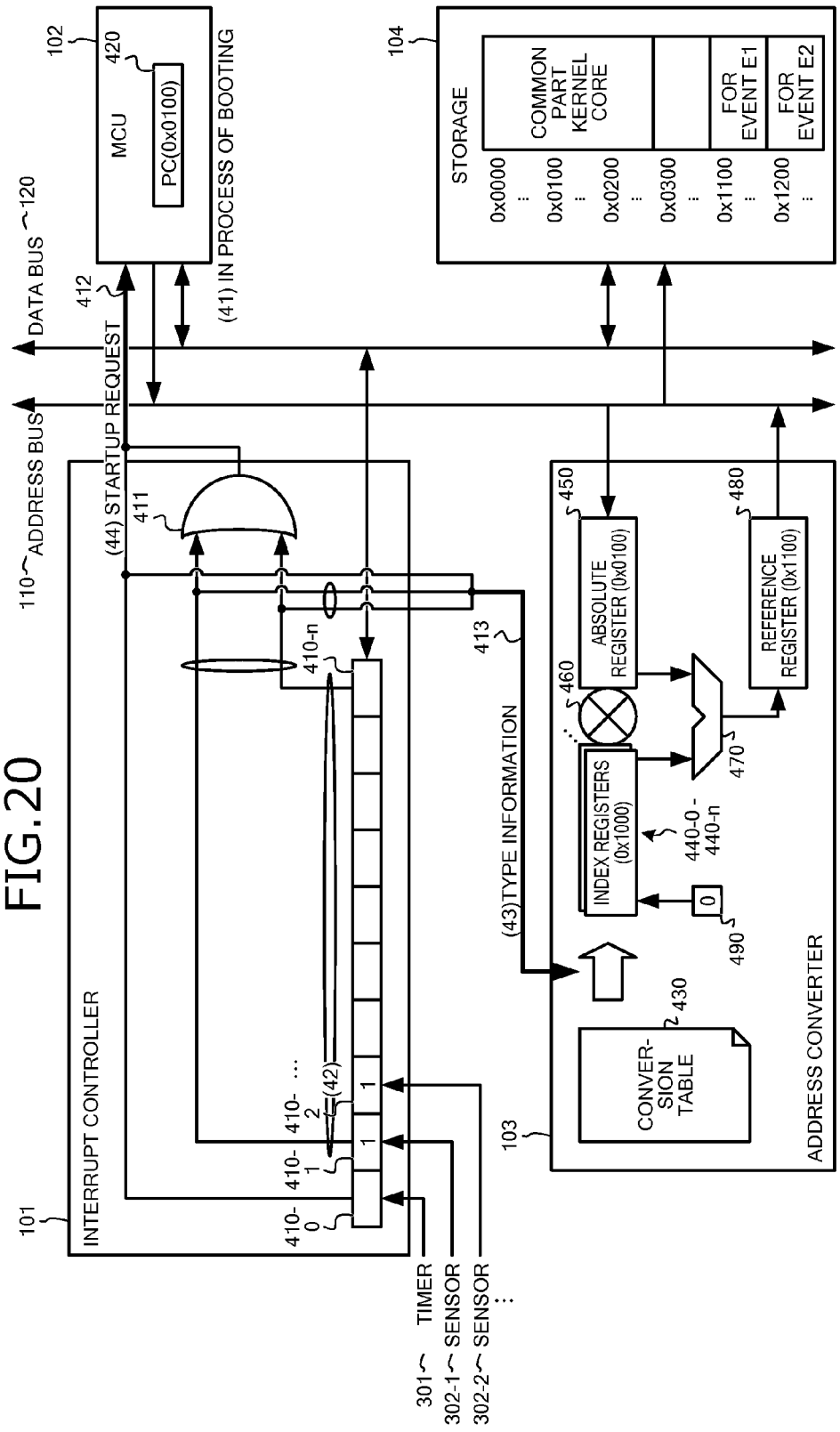
FIGS. 20, 21, 22, 23, 24, 25, 26, and 27 are explanatory views of a content example 2 of activation of the MCU 102 in the sensor node 100.

FIGS. 20, 21, 22, 23, 24, 25, 26, and 27 are explanatory views of the content example 2 of activation of the MCU 102 in the sensor node 100. In FIG. 20, it is assumed that (41) the MCU 102 is in the process of booting, incrementing the program counter 420 in sequence as depicted in FIG. 14, to get a program.

(42) At this time, the sensor 302-2 sends an interrupt signal via a dedicated line to the interrupt control register 410-2 of the interrupt controller 101. As a result, an interrupt flag "1" indicative of "interrupt present" is set in the interrupt control register 410-2.

(43) The interrupt controller 101 sends type information that indicates the type of occurring event to the address converter 103. (44) The interrupt controller 101 sends a startup request to the MCU 102. Description will be given with reference to FIG. 11.

Figure 21:
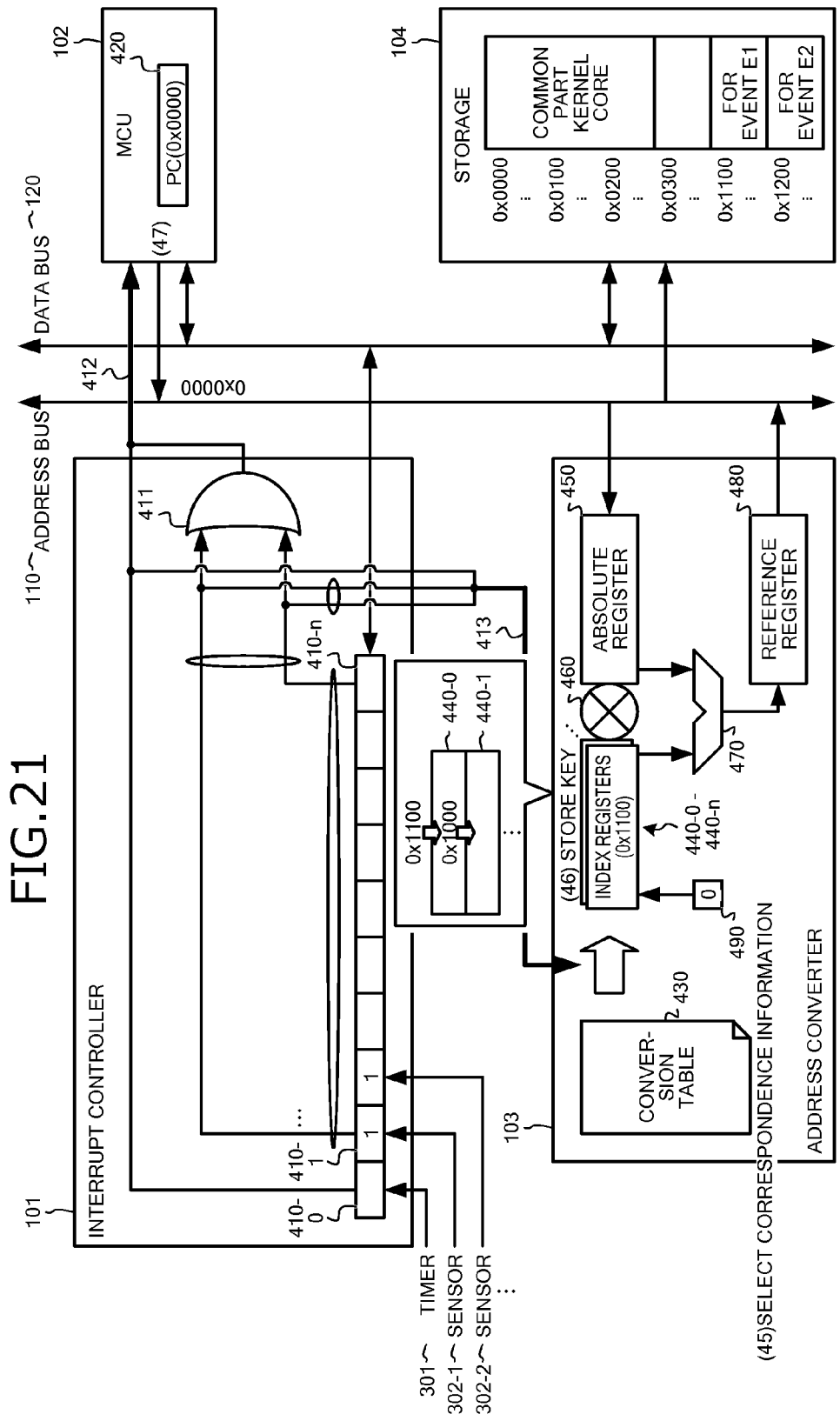

In FIG. 21, (45) the address converter 103 refers to the conversion table 430 to select correspondence information related to the type indicated by the type information. (46) The address converter 103 uses, as a key for identifying the selected correspondence information, a head physical address "0x1100" indicated by the selected correspondence information. At this time, since another head physical address "0x1000" is stored in the index register 440-0, the address converter 103 shifts the storage contents of the index registers 440-0 to 440-(n−1) to the subsequent index registers 440-1 to 440-n, respectively.

The address converter 103 then stores the head physical address "0x1100" as a key into the index register 440-4. (47) When receiving a startup request, the MCU 102 initializes the program counter 420 in order to stop the boot and again start a boot. The MCU 102 then starts the boot and outputs to the address bus 110, an initial value "0x0000" of the logical address stored in the program counter 420. Description will be given with reference to FIG. 22.

Figure 22:
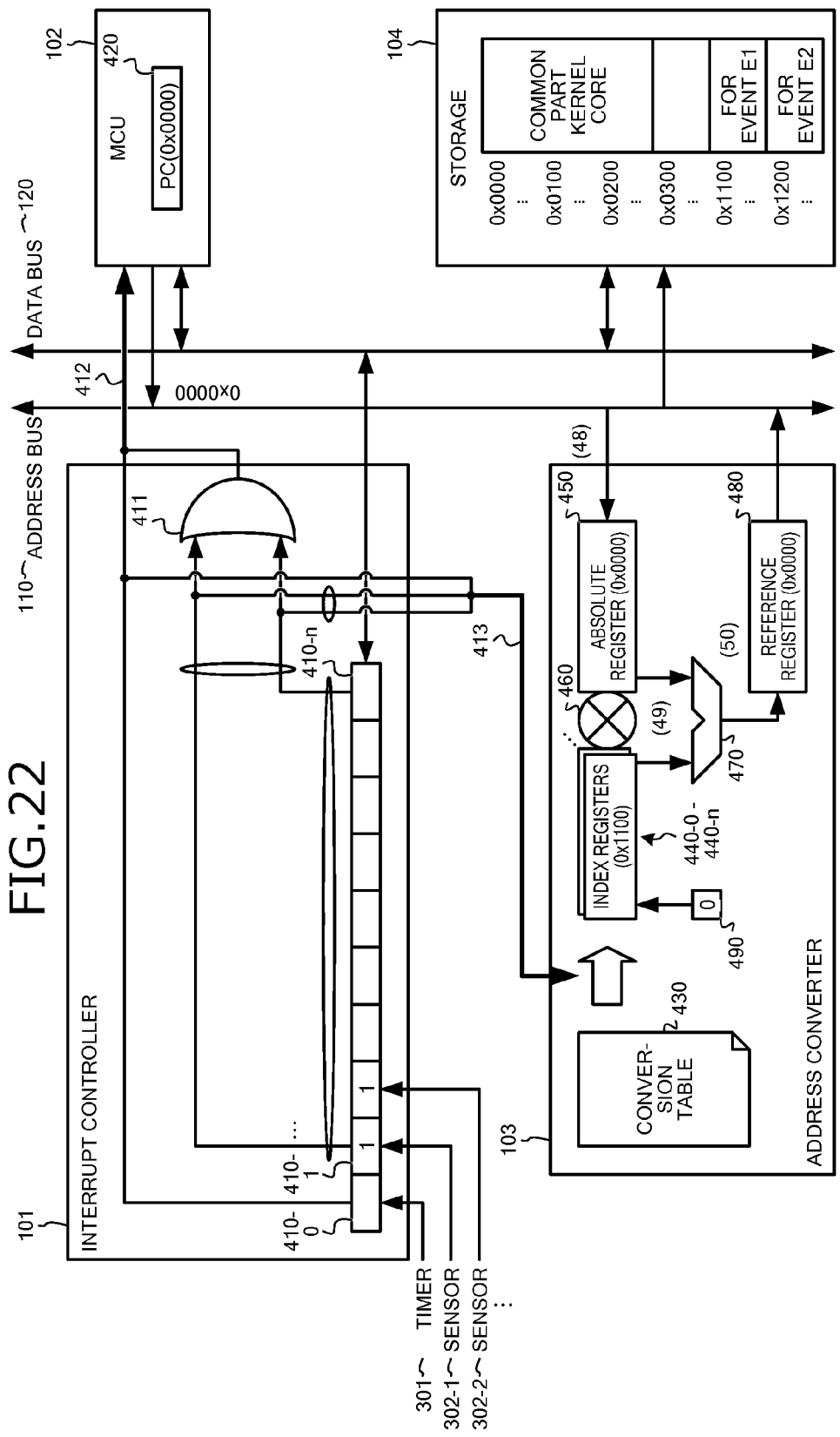

In FIG. 22, (48) the address converter 103 gets the logical address "0x0000" output from the MCU 102 to the address bus 110 and stores the logical address "0x0000" into the absolute register 450.

(49) The address converter 103 then specifies a conversion source logical address group indicated by correspondence information identified by using, as a key, a physical address "0x1100" stored in the index register 440-0. The address converter 103 then determines whether the logical address "0x0000" stored in the absolute register 450 is included in the specified conversion source logical address group.

(50) Since the logical address "0x0000" is not included in the conversion source logical address group, the address converter 103 converts the logical address "0x0000" into a physical address "0x0000", using the page table according to a conventional technique and stores the physical address into the reference register 480. Description will be given with reference to FIG. 23.

Figure 23:
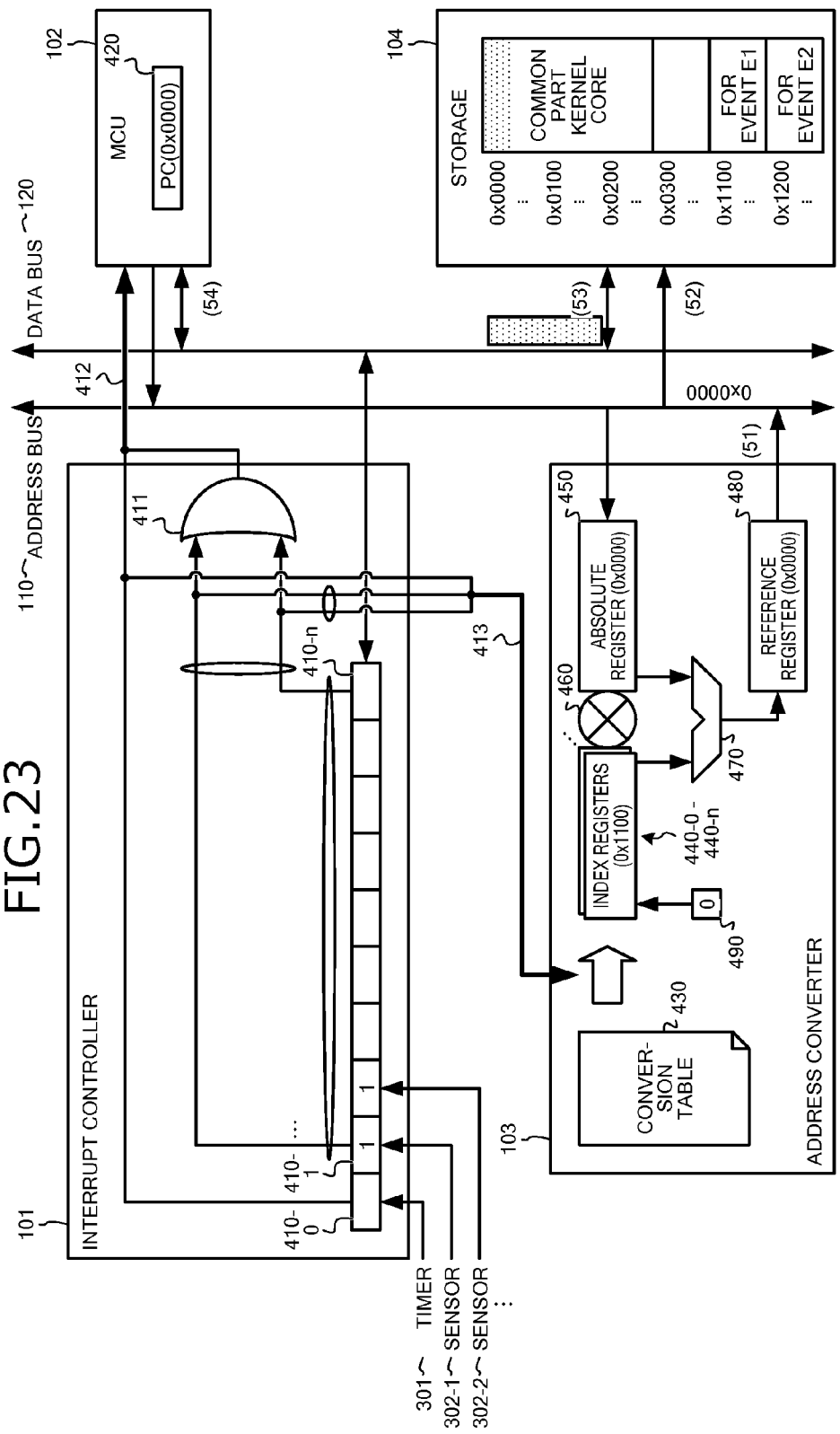

In FIG. 23, (51) the address converter 103 outputs the physical address "0x0000" stored in the reference register 480 to the address bus 110. (52) The storage 104 gets the physical address "0x0000" output to the address bus 110. (53) The storage 104 then outputs to the data bus 120, a common part kernel core stored in a storage area indicated by the physical address "0x0000". (54) The MCU 102 gets the common part kernel core output to the data bus 120. Description will be given with reference to FIG. 24.

Figure 24:
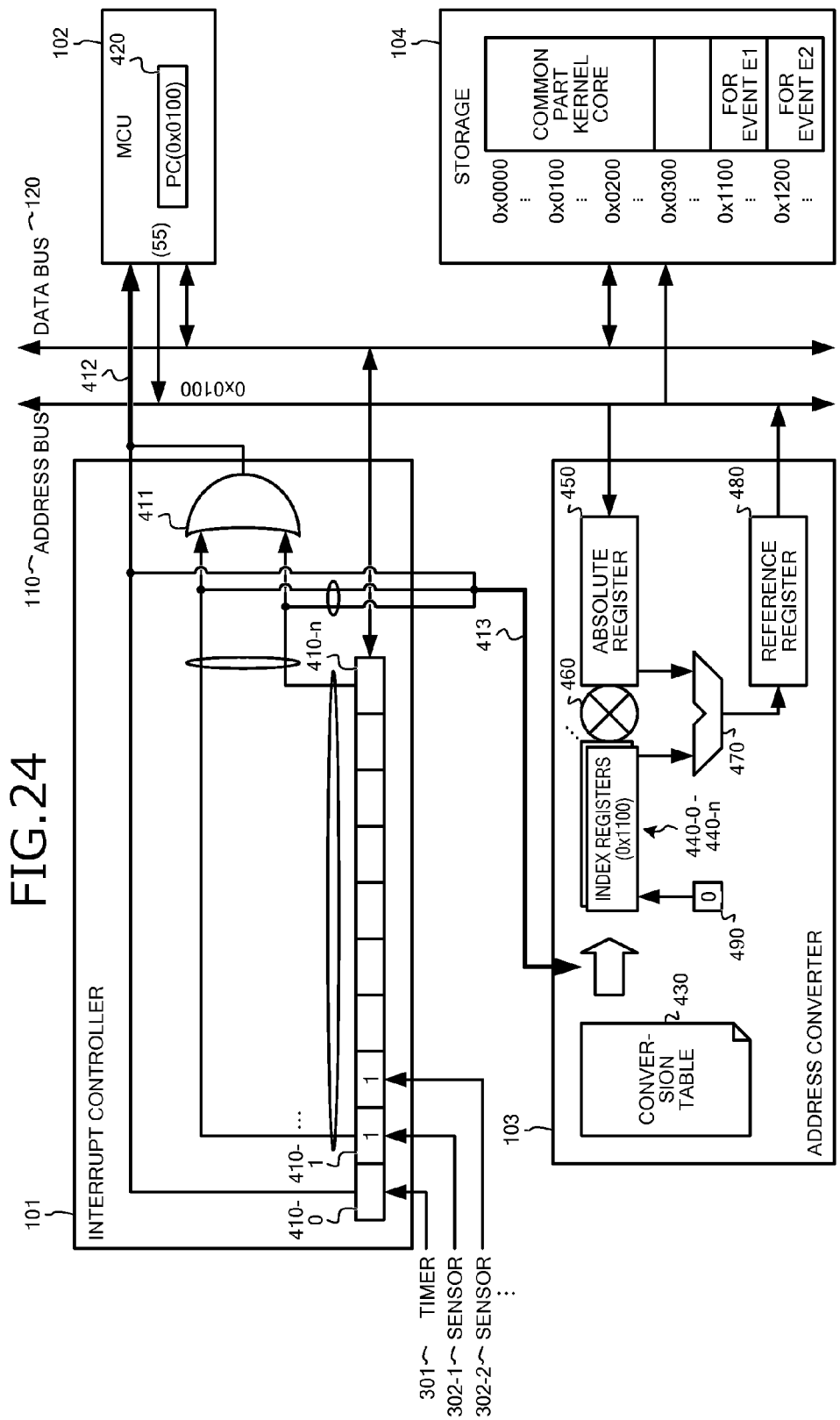

In FIG. 24, (45) the MCU 102 increments the program counter 420 and gets a program in the same manner as at (41) to (54). Thereafter, the MCU 102 increments the program counter 420 in sequence and further gets programs. Assuming that the logical address of the program counter 420 has resulted in "0x0100" by the incrementing, description will be given with reference to FIG. 25.

Figure 25:
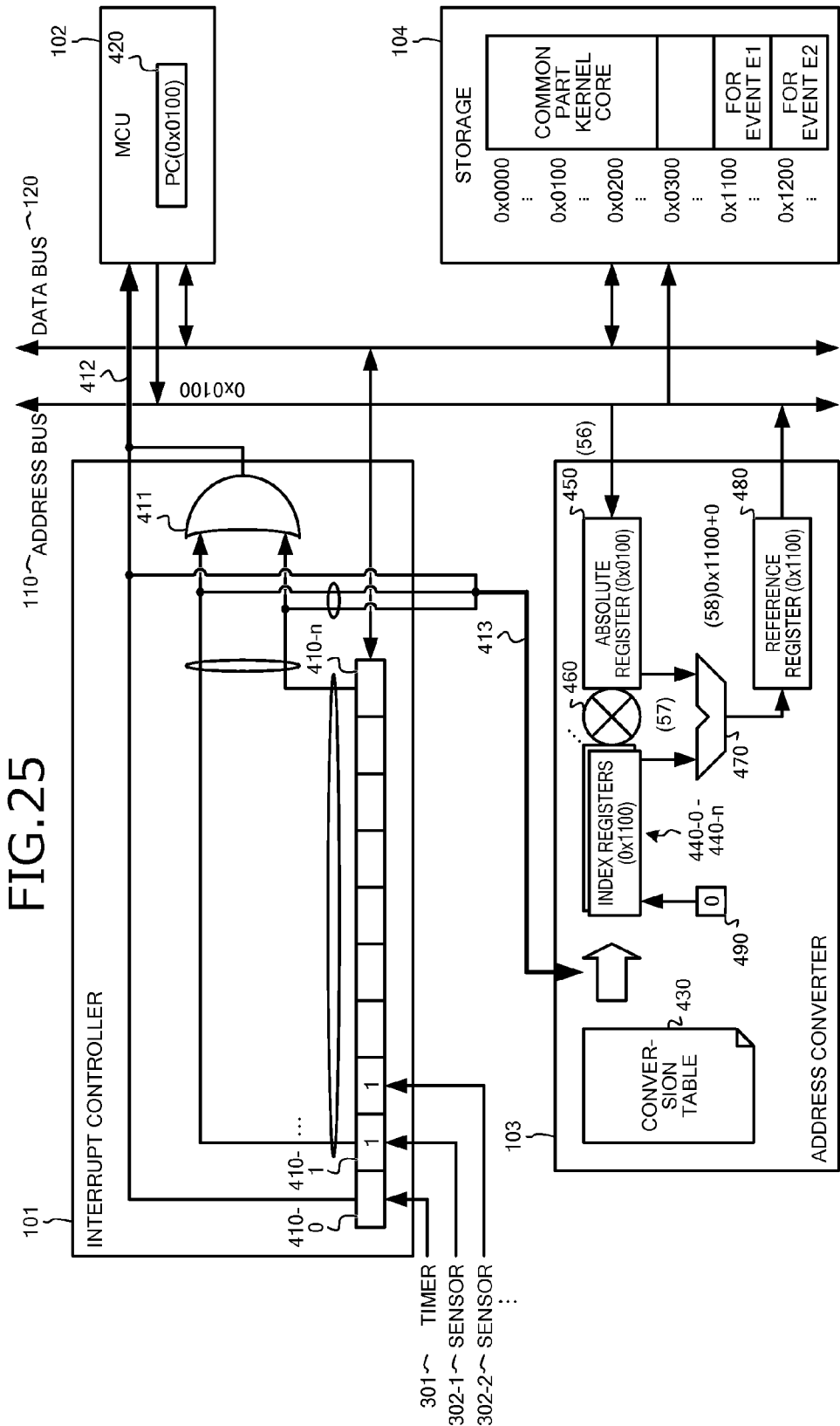

In FIG. 25, the MCU 102 outputs the logical address "0x0100" of the program counter 420 to the address bus 110. (56) The address converter 103 gets the logical address "0x0100" output from the MCU 102 to the address bus 110 and stores the logical address "0x0100" into the absolute register 450.

(57) The address converter 103 then specifies a conversion source logical address group "0x0100 to 0x01ff" indicated by correspondence information identified by using, as a key, the physical address "0x1100" stored in the index register 440-0. The address converter 103 then determines whether the logical address "0x0100" stored in the absolute register 450 is included in the specified conversion source logical address group "0x0100 to 0x01ff".

(58) Since the logical address "0x0100" is included in the conversion source logical address group, the address converter 103 converts the logical address "0x0100" into a physical address "0x1100" and stores the physical address into the reference register 480.

Figure 26:
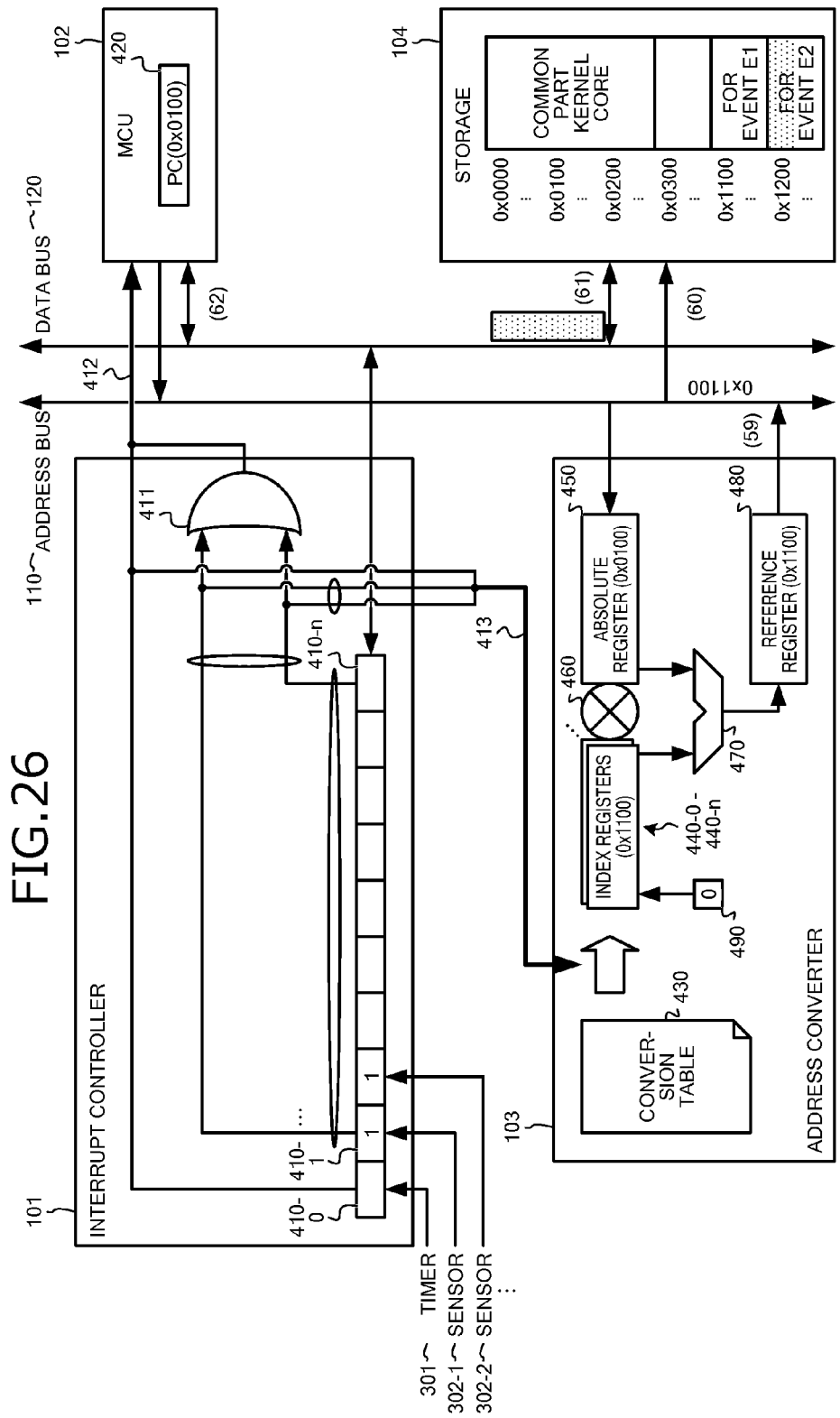

In FIG. 26, (59) the address converter 103 outputs the physical address "0x1100" stored in the reference register 480 to the address bus 110. (60) The storage 104 gets the physical address "0x1100" output to the address bus 110. (61) The storage 104 then outputs to the data bus 120, a program P2 for the event E2 stored in the storage area indicated by the physical address "0x1100". (62) The MCU 102 gets the program P2 for the event E2, output to the data bus 120. Description will be given with reference to FIG. 27.

Figure 27:
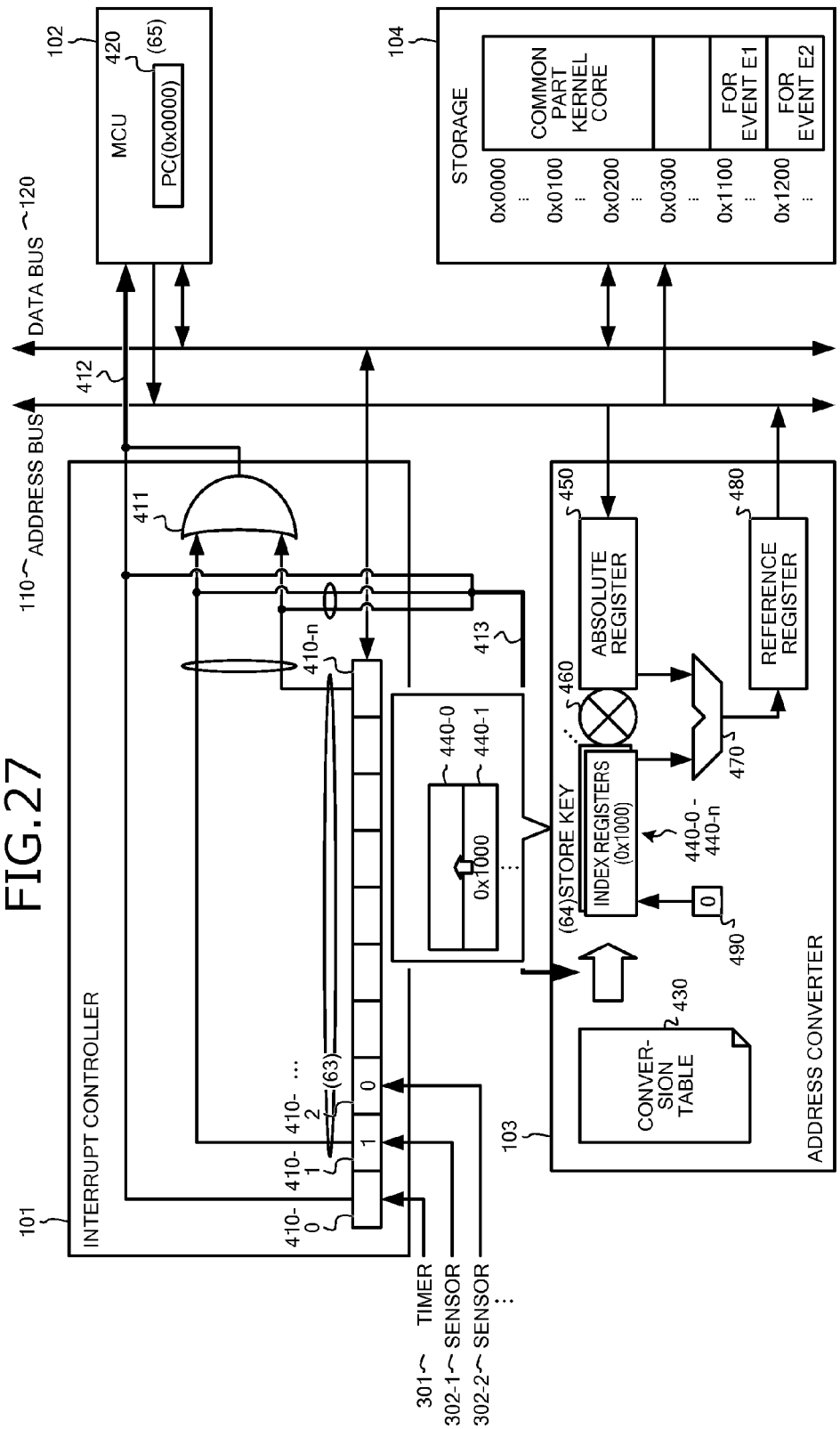

In FIG. 27, it is assumed that the MCU 102 has finished booting. (63) When the MCU 102 has finished booting, the interrupt controller 101 stores an interrupt flag "0" indicating "no interrupt" into the interrupt control register 410-1. Next, the interrupt controller 101 sends boot completion notification to the address converter 103. The interrupt controller 101 again sends a startup request to the MCU 102 since an interrupt flag "1" indicating "interrupt present" is stored in the interrupt control register 401-1.

(64) When receiving the completion notification, the address converter 103 sets the initial value "0" into the index register 440-0 for initialization. Since the head physical address is already stored in the index register 440-1, the address converter 103 shifts the storage contents of the index registers 440-1 to 440-$n$ to the preceding index registers 440-0 to 440-($n-1$), respectively. Thereby, the head physical address "0x1000" is stored as a key in the index register 440-0.

(65) When receiving a startup request resent from the interrupt controller 101, the MCU 102 initializes the program counter 420 to again start a boot. This enables the address converter 103 to select correspondence information for use in the logical address conversion, in the order of interrupts.

Thus, during the execution of the process corresponding to the event E1, the MCU 102 enables interrupt of a process corresponding to the event E2, to execute the process. Thereafter, the MCU 102 can again execute the process corresponding to the event E1. As a result, the storage 104 need not store an interrupt handler for controlling the order of interrupts, suppressing increased the memory usage.

With reference to FIG. 28, description will be given of an example of the procedure of a multiple interrupt process in the sensor node 100.

FIG. 28 is a sequence diagram of an example of the procedure of the multiple interrupt process in the sensor node 100. In FIG. 28, first, when the sensor 302-$i$ detects occurrence of an event, the sensor 302-$i$ sends an interrupt signal to the interrupt controller 101 (step S2801).

Next, when the interrupt controller 101 receives the interrupt signal from the sensor 302-$i$, the interrupt controller 101 sends type information that indicates the type of event to the address converter 103 (step S2802). When the interrupt controller 101 receives the interrupt signal from the sensor 302-$i$, the interrupt controller 101 sends a startup request to the MCU 102 (step S2803).

Next, when the address converter 103 receives the type information from the interrupt controller 101, the address converter 103 refers to the conversion table 430 to select correspondence information related to the type indicated by the received type information, and stores a key of the selected correspondence information into the index register 440-0 (step S2804). The MCU 102 starts a boot process depicted in FIG. 19 (step S2805).

Here, it is assumed that an event has occurred in the sensor 302-$i$ before the completion of the boot process of step S2805. When the sensor 302-$i$ detects the occurrence of the event, the sensor 302-$i$ sends an interrupt signal to the interrupt controller 101 (step S2806).

Next, when the interrupt controller 101 receives the interrupt signal from the sensor 302-$i$, the interrupt control 101 sends type information that indicates the type of event to the address converter 103 (step S2807). When the interrupt controller 101 receives the interrupt signal from the sensor 302-$i$, the interrupt controller 101 sends a startup request to the MCU 102 (step S2808).

When the address converter 103 receives the type information from the interrupt controller 101, the address converter 103 refers to the conversion table 430 to select correspondence information related to the type indicated by the received type information, and stores a key of the selected correspondence information into the index register 440-0 (step S2809). Here, the address converter 103 shifts the storage contents of the index registers 440-$k$ to the subsequent index registers 440-($k+1$), respectively. The MCU 102 stops the boot process at step S2805 and again starts the boot process depicted in FIG. 19 (step S2810).

Here, it is assumed that the boot process at step S2810 has ended. When the boot process ends, the MCU 102 sends completion notification to the interrupt controller 101 (step S2811). When the interrupt controller 101 receives the completion notification, the interrupt controller 101 sends completion notification to the address converter 103 due to the presence of an event whose interrupt process has not yet ended (step S2812). When receiving the completion notification, the interrupt controller 101 sends a startup request to the MCU 102 due to the presence of an event whose interrupt process has not yet ended (step S2813).

Next, when receiving the completion notification from the interrupt controller 101, the address converter 103 stores a key of the index register 440-1 into the index register 440-0 (step S2814). At this time, the address converter 103 shifts the storage contents of the index registers 440-$k$ to the preceding index registers 440-($k-1$), respectively, for example, to thereby again store the key. The MCU 102 again starts the boot process depicted in FIG. 19 (step S2815).

This enables the address converter 103 to select correspondence information, in the order to be processed, each time the MCU 102 starts a boot, whereby the logical address conversion can be executed based on the selected correspondence information. Therefore, the MCU 102 can execute a program corresponding to an event, in the order to be processed, each time the MCU 102 starts a boot. In other words, the address converter 103 can execute operations enabling the multiple interrupt.

As described above, when an event occurs, the converting apparatus 700 selects correspondence information that indicates a correspondence relation between a conversion source logical address corresponding to the event and a physical address converted from the logical address. When the MCU 102 accesses a conversion source logical address, the converting apparatus 700 converts the logical address into a physical address, using the correspondence relation indicated by the selected correspondence information. Thereby, the disclosed converting apparatus 700 can control the MCU 102 to get and run a program corresponding to the event.

Thus, the MCU 102 can run a program corresponding to the event without executing branch processing for selecting and running the program corresponding to the event. As a result, the MCU 102 curtails the time consumed for the branch processing, leading to a shortened startup period. The storage 104 need not store a program related to the branch processing, preventing the memory usage from increasing.

Since the MCU 102 has a shortened startup period, the MCU 102 can restrain the power consumption from increasing. Therefore, even in the case of a limited amount of power supply from the harvester 311, the sensor node 100 can control the MCU 102 to operate within the range of the limited amount of power supply.

A new event may occur before the completion of a boot of the MCU 102, triggered by an event that occurred in the past. This results in the termination of the boot triggered by the event that occurred in the past and the start of a boot of the MCU 102 triggered by the new event. In this case, the disclosed converting apparatus 700 selects correspondence information related to the new event while storing correspondence information related to the type of the past event. The converting apparatus 700 uses the selected correspondence information to convert a logical address accessed by the MCU 102 into a physical address.

In a case where after the completion of a boot of the MCU 102 triggered by a new event, the MCU 102 is again booted by the past event, the converting apparatus 700 gets correspondence information related to the past event that has already been stored. The converting apparatus 700 then uses the correspondence information to convert the logical address accessed by the MCU 102 into a physical address. Thus, in sequence from an event to be preferentially processed by interrupt, the disclosed converting apparatus 700 can select correspondence information related to the event, to control the MCU 102 to run a program corresponding to the event, enabling a curtailment of the interrupt handler for controlling the interrupt order in the MCU 102 and thus, in a curtailment of the usage of the storage 104.

The converting apparatus 700 stores a key of the selected correspondence information in the index register 440-k, enabling the index register 440-k to have a smaller physical size as compared with the case of storing the correspondence information itself, resulting in a reduced production cost of the converting apparatus 700. The converting apparatus 700 stores the key of the selected correspondence information in the index 440-k, instead of storing the key in the non-volatile memory in the converting apparatus 700, thereby reducing the number of reads from the non-volatile memory, suppressing increases in power consumption.

The storage 104 separately stores the common part kernel core describing processes common to the events and programs describing processes specific to the respective events. The disclosed converting apparatus 700 combines the common part kernel core and programs corresponding to events that have occurred, to control the MCU 102 to get the combination. This enables the usage of the storage 104 to be reduced as compared with a case where the storage 104 stores, for each event, a program combining the common part kernel core and a program for the event.

The converting apparatus 700 adds the difference from the head logical address of the conversion source logical addresses to the logical address accessed by the MCU 102 and the head physical address of the physical addresses converted from the logical addresses. The converting apparatus 700 specifies, through the addition, a physical address converted from the logical address accessed by the MCU 102. Thus, the correspondence information need not indicate physical addresses but merely has to indicate a head physical address of the physical addresses. As a result, the converting apparatus 700 can reduce the size of the storage area used for the storage of correspondence information.

Configuration may be such that the sensor node has, for each type of event, an MCU executing only a process corresponding to the each type and activates an MCU corresponding to the type of an occurring event to cause the MCU to execute the process, thereby shortening the startup period of the MCU. Such a configuration, however, results in the sensor node having an increased production cost and an increased physical size making installation to the installation area difficult. On the other hand, according to the converting apparatus 700, even in the case of a single MCU 102 as depicted in FIG. 2, the single MCU 102 can execute processes corresponding respectively to the types of events that have occurred, while restraining the production cost and the physical size of the sensor node 100.

An aspect of the present invention provides an effect that the startup period of the processor can be shortened.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A converting apparatus comprising:
   a storage configured to store correspondence information that indicates correspondence relations between logical addresses accessed by a processor for booting and physical addresses converted from the logical addresses, the correspondence information being correlated with each type of an event booting the processor; and
   an address converter configured to:
   select correspondence information related to the type of the event,
   specify a physical address converted from the logical address accessed by the processor in case of the processor accessing a logical address in response to the event, and
   control the processor to get a program stored in the storage, the program indicated by the specified physical address.

2. The converting apparatus according to claim 1, wherein the address converter, when a first event booting the processor occurs, selects correspondence information related to the type of the first event by referring to the storage, and when a second event booting the processor and taking priority over the first event occurs before the processor finishes booting triggered by the first event, the address converter selects correspondence information related to the type of the second event by referring to the storage, and
   the address converter, when the processor accesses a logical address included among the logical addresses corresponding to the second event in response to occurrence of the second event, specifies using correspondence information related to the type of the second event, a physical address converted from the logical address accessed by the processor, and when after the processor finishes booting triggered by the second event, the processor accesses in response to the first event, a logical address included among the logical addresses and corresponding to the first event, the address converter using correspondence information related to the type of the first event, specifies a physical address converted from the logical address accessed by the processor.

3. The converting apparatus according to claim 1, wherein the address converter is configured to store a register, identification information for identifying the selected correspondence information, and
   the address converter using the correspondence information identified by the identification information stored to the register, specifies a physical address converted from the logical address accessed by the processor.

4. The converting apparatus according to claim 1, wherein the storage is configured to store correlated with each type of an event, first correspondence information that indicates correspondence relations between logical addresses that are among the logical addresses and specific to the type of event and physical addresses that have been converted from the logical addresses specific to the type of event and indicate a storage area of a program specific to the type of event in the storage, the storage is configured to store second correspondence information that indicates correspondence relations between logical addresses that are common to each type of event and among the logical addresses and physical addresses that have been converted from the common logical addresses and indicate a storage area of a program common to each type of event in the storage, and the address converter, when the processor accesses a logical address included in logical addresses specific to the type of event that has occurred, uses the first correspondence information corresponding to the type of event that has occurred and specifies a physical address converted from the logical address accessed by the processor, and when the processor accesses a logical address included among the common logical addresses, the address converter uses the second correspondence information and specifies a physical address converted from the logical address accessed by the processor.

5. The converting apparatus according to claim 1, wherein the correspondence information indicates a head logical address of the logical addresses and a head physical address converted from the head logical address, and the address converter specifies a physical address converted from the logical address accessed by the processor, by adding a difference from the head logical address to the logical address accessed by the processor and the head physical address.

6. A conversion method executed by a converting apparatus capable of accessing a storage configured to store correspondence information that indicates correspondence relations between logical addresses accessed by a processor for booting and physical addresses converted from the logical addresses, the correspondence information being correlated with each type of an event booting the processor, the converting method comprising:

selecting correspondence information related to the type of the event;

specifying a physical address converted from the logical address accessed by the processor in case of the processor accessing a logical address in response to the event; and controlling the processor to get a program stored in the storage, the program indicated by the specified physical address.

7. An information processing system comprising:

a processor;

a converting apparatus that converts a logical address accessed by the processor into a physical address; and a controller that detects occurrence of an event, wherein the controller, upon detecting the occurrence of an event booting the processor, sends a startup request to the processor and sends to the converting apparatus, type information that indicates a type of the event that has occurred, the converting apparatus, upon receiving the type information from the controller, selects correspondence information related to the type indicated by the type information, by referring to a storage configured to store correspondence information that indicates correspondence relations between logical addresses accessed by a processor for booting and physical addresses converted from the logical addresses, the correspondence information being correlated with each type of an event booting the processor, the processor, upon receiving the startup request from the controller, outputs a request to access a logical address included among the logical addresses, the converting apparatus using the selected correspondence information, specifies a physical address converted from the logical address requested by the access request output from the processor, and the processor gets and runs a program stored in the storage, the program indicated by the physical address specified by the converting apparatus.

* * * * *